United States Patent

Stanisic et al.

[11] Patent Number: 6,026,703
[45] Date of Patent: Feb. 22, 2000

[54] DEXTEROUS SPLIT EQUATOR JOINT

[76] Inventors: Michael M. Stanisic, 52725 Swanson Dr., South Bend, Ind. 46635; Jared M. Wiitala, 3813 Morgan St., Apt. 2-B, South Bend, Ind. 46628; Steven J. Remis, 430 Parkovash, South Bend, Ind. 46617

[21] Appl. No.: 08/911,107

[22] Filed: Aug. 14, 1997

[51] Int. Cl.[7] .................................................... B25S 17/02
[52] U.S. Cl. ......................... 74/490.06; 901/29; 464/106
[58] Field of Search ......................... 74/490.06, 490.05, 74/490.01, 665; 901/25, 28, 29; 464/100

[56] References Cited

U.S. PATENT DOCUMENTS

| | | |
|---|---|---|
| 3,965,700 | 6/1976 | Nicoletti ................................ 74/490.05 |
| 3,973,469 | 8/1976 | Humen . |
| 4,045,958 | 9/1977 | Wells . |
| 4,068,536 | 1/1978 | Stackhouse . |
| 4,068,763 | 1/1978 | Fletcher et al. . |
| 4,073,201 | 2/1978 | Taylor et al. . |
| 4,194,437 | 3/1980 | Rosheim . |
| 4,296,681 | 10/1981 | Rosheim . |
| 4,574,655 | 3/1986 | Kimura et al. . |
| 4,628,765 | 12/1986 | Dien et al. . |
| 4,683,406 | 7/1987 | Ikeda et al. . |
| 4,686,866 | 8/1987 | Rosheim . |
| 4,723,460 | 2/1988 | Rosheim . |
| 4,729,253 | 3/1988 | Rosheim . |
| 4,804,220 | 2/1989 | Rosheim . |
| 4,821,594 | 4/1989 | Rosheim et al. . |
| 4,878,393 | 11/1989 | Duta et al. . |
| 4,911,033 | 3/1990 | Rosheim et al. . |
| 5,036,724 | 8/1991 | Rosheim . |
| 5,239,883 | 8/1993 | Rosheim . |

*Primary Examiner*—Tamara L. Graysay
*Assistant Examiner*—Marcus Charles
*Attorney, Agent, or Firm*—Barnes & Thornburg

[57] ABSTRACT

This invention comprises a general redundant spherical linkage capable of producing a hemisphere or greater of singularity-free, relative motion of two arms which intersect at a fixed point. All points of all links of the invention move on spheres that are concentric about this fixed point of intersection of the two arms. In a general way, the invention can be considered as a sphere which is divided by a central link that supports two pairs of scissoring and intersecting axes of rotation for four semicircular links that are 180° arcs. The semicircular links maintain a constant angle at their point of overlap and support radial arms having axes which pass through the center of the sphere. Each pair of pivoted links controls the spherical motion of one arm within one hemisphere. By simultaneously controlling all four pivoted links, arbitrary relative motion of the two arms can be achieved.

54 Claims, 16 Drawing Sheets

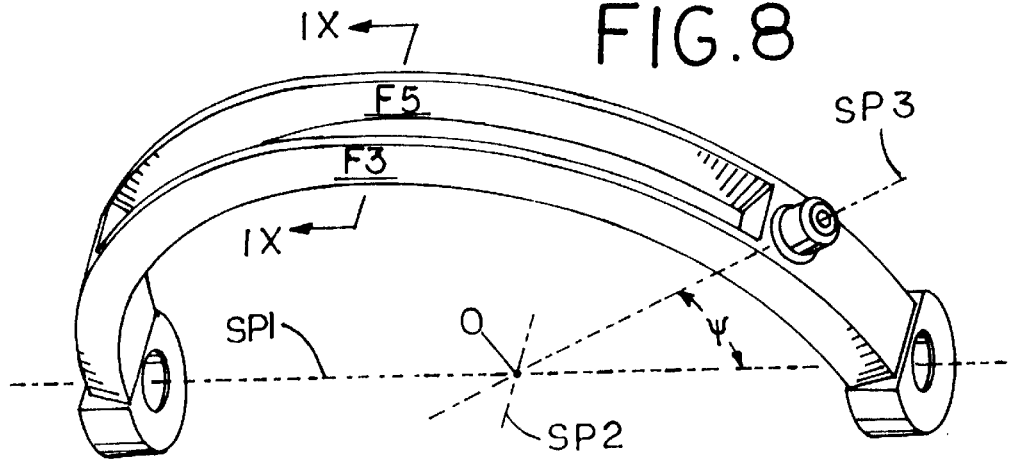
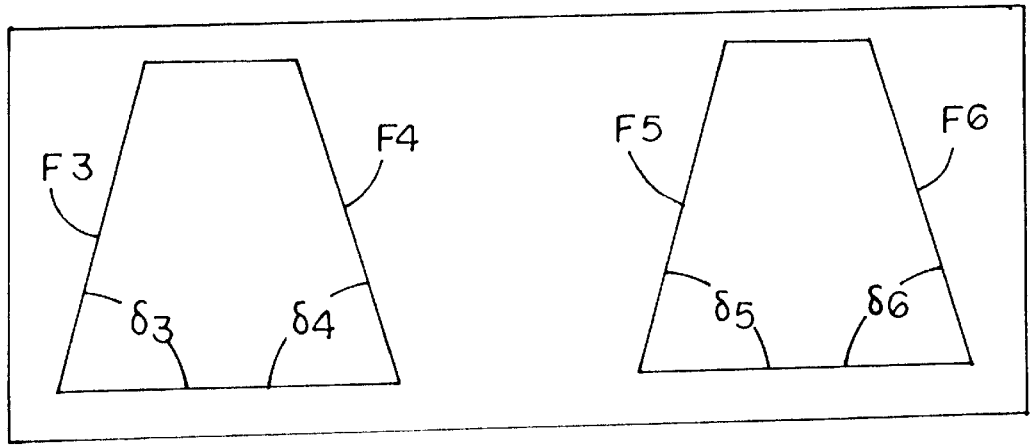
FIG.9

DEXTEROUS SPLIT EQUATOR JOINT

BACKGROUND OF THE INVENTION

1. Field of the Invention

The present invention relates generally to the field of robotics and more particularly to a robotic joint (wrist or shoulder joint) having pivoted semicircular links and a split equator which allows for a scissoring action between the rotation axes of these pivoted links about a center point, all this to produce a relative pointing action between a pair of arms.

2. Description of the Related Art

The Humen U.S. Pat. No. 3,973,469 shows a power transmission mechanism which utilizes a spherical member and can be back-driven through fluid pressure to actuate a ball in socket joint which can serve as a robot wrist.

The Wells U.S. Pat. No. 4,045,958 shows a hydraulically actuated multi-directional positioning system which can serve as a robot wrist.

The Rosheim U.S. Pat. Nos. 4,194,437 and 4,2996,681 both describe hydraulic servo mechanisms which can be used as robot wrists.

The Dien U.S. Pat. No. 4,628,765 describes the use of slotted semi-circular links to in order to actuate a ball in socket joint that can serve as a robot wrist. The system produces less than a hemisphere of dextrous workspace.

The Ikeda U.S. Pat. No. 4,683,406 describes a wrist joint assembly which is said to be similar to the human forehand.

The Taylor U.S. Pat. No. 4,073,201 describes a wrist joint with three mutually intersecting axes of rotation. The mechanism has a unique C-shape which allows movement of the roll axis (i.e., pointing) through an arc in excess of 180°.

The Rosheim U.S. Pat. Nos. 4,686,866, 4,723,460, 4,729,253, 5,036,724, and 5,239,883 present non-spherical robot wrists with singularity-free workspaces.

The Kimura U.S. Pat. No. 4,574,655 uses three mutually intersecting axes of rotation and a system of bevel gears and drive shafts to actuate these axes.

The Stackhouse U.S. Pat. No. 4,068,536 also shows a geared three axis wrist which uses concentric drive shafts to transmit the rotations to the axes.

The Fletcher U.S. Pat. No. 4,068,763 presents a geared three axis wrist which claims a fine positioning ability.

The Rosheim U.S. Pat. No. 4,804,220 presents a tendon-actuated and non-spherical robot wrist with a singularity-free workspace.

The Rosheim U.S. Pat. No. 4,821,594 presents a non-spherical robot joint with a singularity-free workspace.

The Rosheim U.S. Pat. No. 4,911,033 presents a complete robot manipulator which incorporates a non-spherical robot joint for the wrist and another for the shoulder of a manipulator.

The Duta and Stanisic U.S. Pat. No. 4,878,393 shows a singularity-free and spherical robot wrist joint with a solid equator which does not permit a scissoring action between the axes of rotation of the pivoted semicircular links.

With the exception of the Rosheim patents and the Duta and Stanisic patent, all of the above-described conventional robot joints are capable of less than a hemisphere of singularity-free workspace. The Rosheim patents all contain non-spherical arrangements and the Duta and Stanisic patent contains a solid equator which will not permit a scissoring action between the axes of rotation of the pivoted semi-circular links about the center point of the joint.

SUMMARY OF THE INVENTION

The present invention is a redundant joint which is free of both interference and singularities within a maximized workspace. The joint includes a pair of two degree-of-freedom pointing systems occupying opposing adjustment hemispheres within a sphere, each system having overlapping semicircular links or hoops connected at a fixed angle relative to one another by common support links or carriages. In one embodiment, the joint has four degrees-of-freedom, requiring a minimum of four actuating motors. The joint produces the only non-unique pointing solution or singularity when the point of overlap of one pair of semicircular links essentially coincides with the point of overlap of the other pair of semicircular links. The imposition of two constraint relations among the remaining four degrees-of-freedom of the present invention results in a two degree-of-freedom symmetrically actuated double pointing system requiring a minimum of two actuating motors.

In one embodiment, the inventive joint provides coordinated actuation of four semicircular links to produce relative motion of a pair of radial arms. The invention also provides a passive spherical joint, such as would be useful in power and/or motion transmitting shafts or linkages.

Applications of the invention exist in robotics, both as a wrist or shoulder joint, for an industrial manipulator. In addition, applications exist in the aiming of searchlights, weaponry, antennae, radar dishes, solar collectors, video cameras, laser lights, conventional lights, power transmitting joints, and the like.

Other objects, advantages and features of the present invention will become apparent upon consideration of the following description of embodiments of the invention and accompanying drawings.

BRIEF DESCRIPTION OF THE DRAWINGS

FIG. 8 is a perspective view of a split rail cross section version of a semicircular link or hoop according to the present invention.

FIG. 9 is a cross sectional view taken substantially along line IX—IX of FIG. 8.

DETAILED DESCRIPTION OF EMBODIMENTS OF THE INVENTION

1. Kinematic Structure

Figure 1:
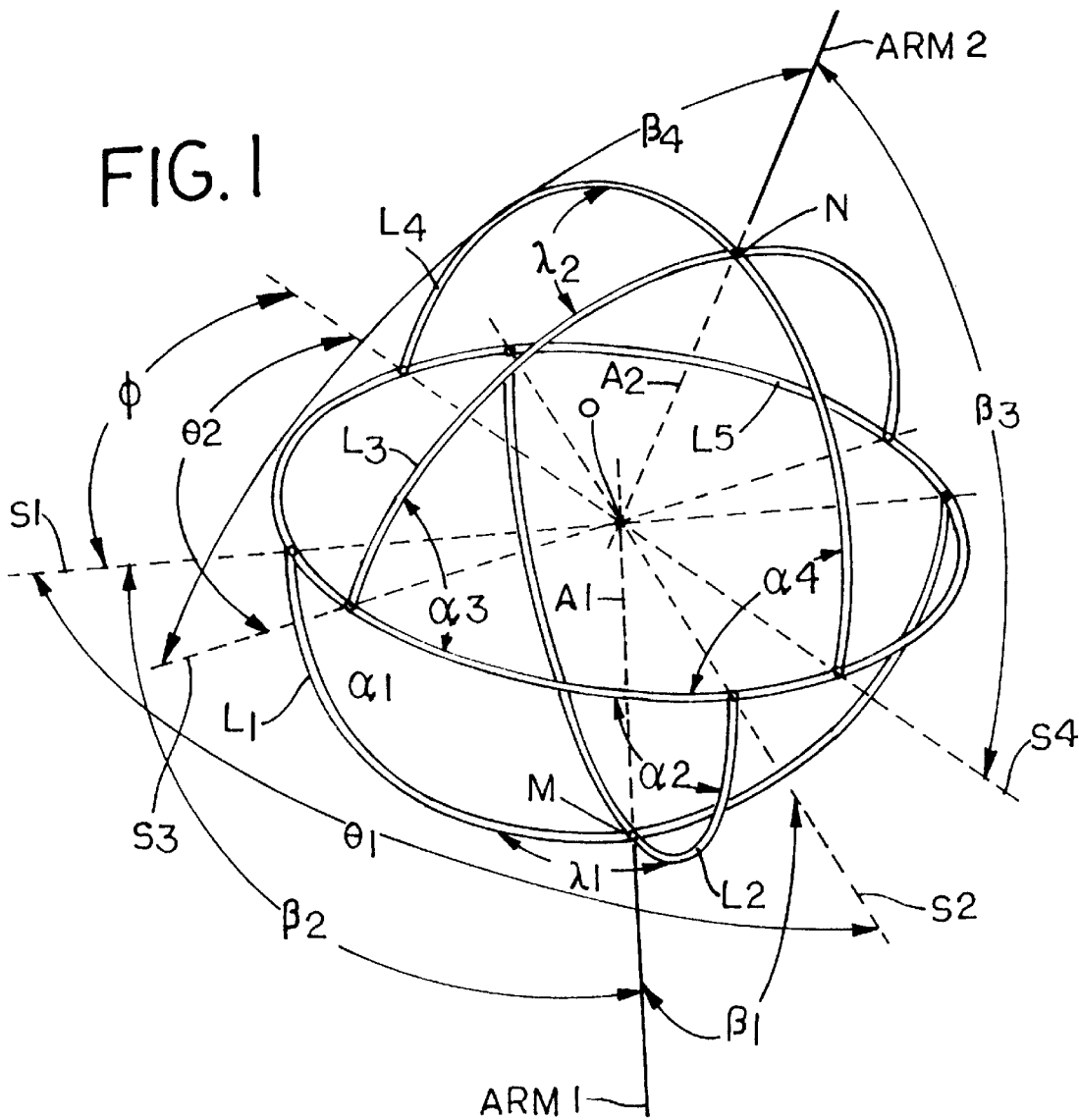
FIG. 1 is a schematic drawing of a four degree-of-freedom generalized double pointing system according to the present invention.

A schematic of the general concept of the present invention is shown in FIG. 1. The spherical linkage includes two pairs of semicircular links, or hoops, a first pair L1 and L2 pivot independently on a central equator link L5 about the axes S1 and S2, respectively. Located in the plane of link L5, or in the "plane of the 'equator,'" axes S1 and S2 are allowed to rotate relative to one another, on link L5, by the angle $\theta_1$ measured about their intersection point O as shown in FIG. 1. Similarly, link pair L3 and L4 pivot independently on central equator link L5 about the axes S3 and S4, respectively. As further described herein, equator link L5 includes two pivoting links to accommodate the independent pivoting of pairs L1, L2 and L3, L4. Also located in the "plane of the 'equator,'" axes S3 and S4 are allowed to rotate relative to one another, on link L5, by the angle $\theta_2$ measured about their intersection point O as shown in FIG. 1. The two pair of intersecting axes S1 and S2, and S3 and S4, are offset by a constant angle of $\phi$, between 0° and 180°. Link L5 and the defined plane of the equator divide the joint into two adjustment hemispheres, a lower adjustment hemisphere which contains links L1 and L2, and an upper adjustment hemisphere which contains links L3 and L4.

Links L1 and L2 intersect in the lower hemisphere at point M on a sphere centered at point O. ARM 1 is mechanically constrained so that its axis A1 passes through the point O, and is at a constant angular offset, shown as 0° in FIG. 1, from a line connecting the points O and M. $\lambda_1$ is the constant angle between links L1 and L2 at the point M, measured about the line connecting points O and M. Similarly, links L3 and L4 intersect in the upper adjustment hemisphere at point N on a sphere centered at point O. ARM 2 is mechanically constrained so that its axis A2 passes through the point O at a constant angular offset, shown as 0°, from the line connecting the points O and N. $\lambda_2$ is the constant angle between links L4 and L3 at the point N, measured about the line connecting the points O and N. Both $\lambda_1$ and $\lambda_2$ may have a constant value between 0° and 180°.

Figure 2:
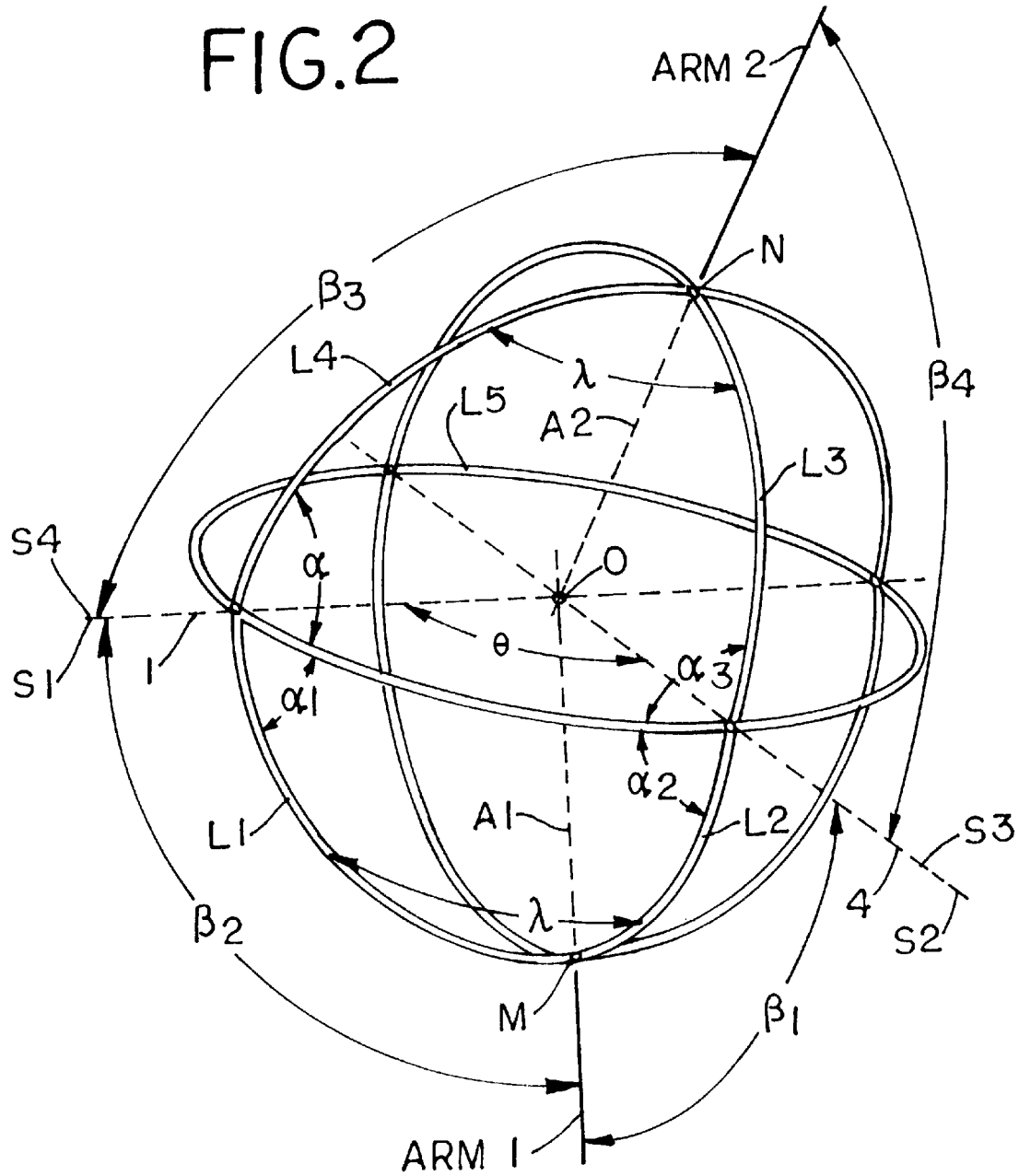
FIG. 2 is a schematic drawing of a pointing system according to the present invention wherein each of two pair of intersecting axes remain coincident.

FIG. 2 represents a schematic drawing of the system when $\phi=0°$, in which case the axes S1 and S4 are coincident and labeled the common axis 1. Additionally, the constant angles $\lambda_1$ and $\lambda_2$ have been set equal such that $\lambda_1=\lambda_2=\lambda$. The previous statement allows for the rotation angles $\theta_1$ and $\theta_2$ to be identical such that $\theta_1=\theta_2=\theta$), requiring that the axes S2 and S3 remain coincident as indicated by their common axis labeled 4. Therefore, coincident axes S1 and S4 (axis 1) are allowed to rotate in the plane of the equator on link L5 relative to the coincident axes S2 and S3 (axis 4) by the variable angle $\theta$ measured about their intersection point O.

Figure 3:
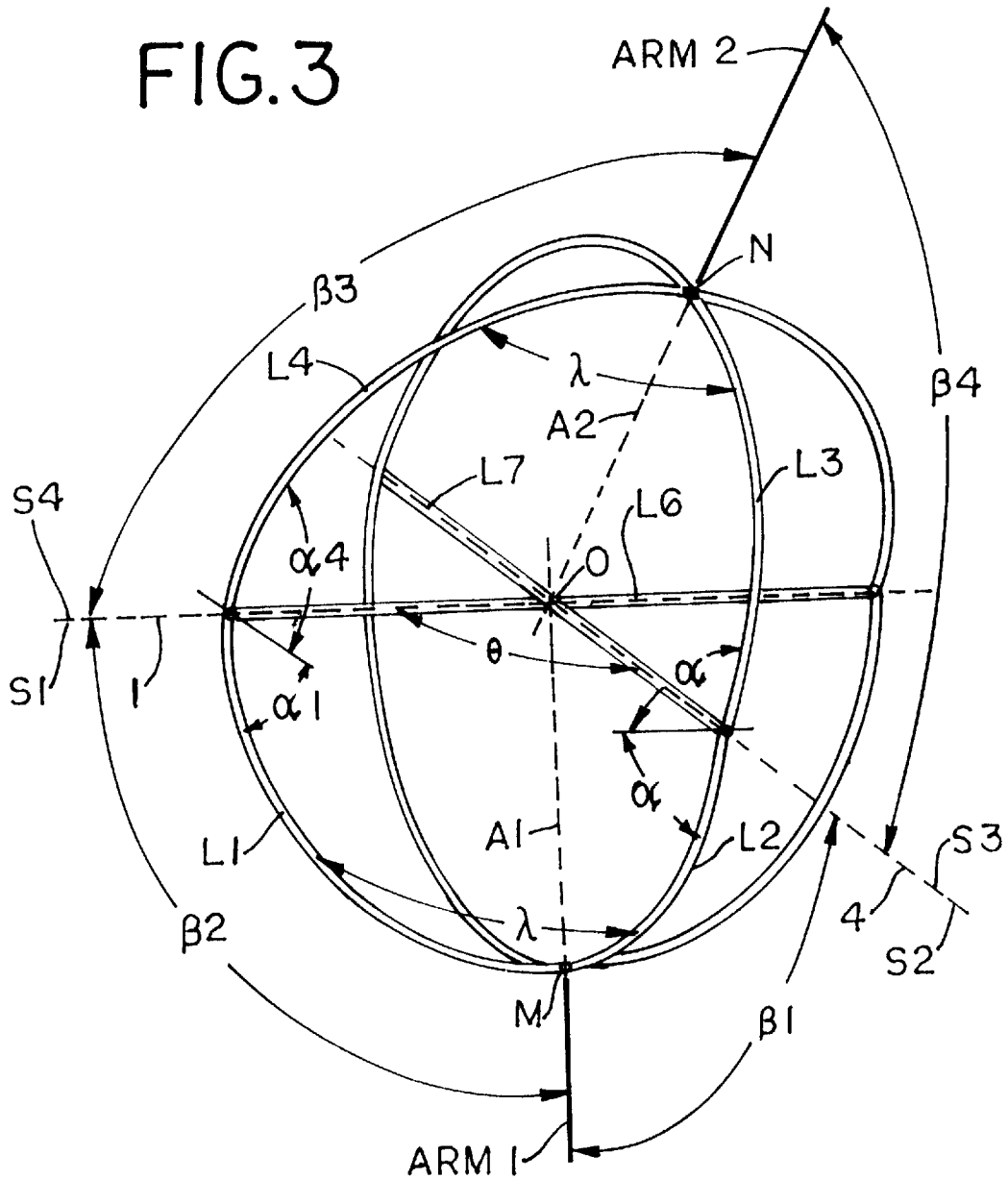
FIG. 3 is a schematic drawing of a pointing system according to the present invention wherein the single central link of FIG. 2 has been replaced with a kinematically equivalent pair of intersecting and pivoting links.

FIG. 3 shows an alternative embodiment of the system shown in FIG. 2 where link L5 has been replaced by a kinematically equivalent pair of links L6 and L7. Link L6, which carries axis 1 and the pivoting semicircular link pair L1 and L4, may rotate by an angle $\theta$ measured about the intersection point O, in the plane of the equator, relative to link L7, which carries axis 4 and the pivoting link pair L2 and L3.

The invention shown schematically in FIGS. 1–3 has eight possible actuation parameters. The first four are the joint angles $\alpha_1$, $\alpha_2$, $\alpha_3$, and $\alpha_4$ formed by links L1, L2, L3, and L4 with the plane of the equator about the axes S1, S2, S3, and S4, respectively. By coordinating the four angular motions $\alpha_1$, $\alpha_2$, $\alpha_3$, and $\alpha_4$, any prescribed motion of ARM 1 relative to ARM 2 can be achieved, with the exception of passing the point M through point N. The remaining four possible parameters for actuation are the arclengths $\beta_1$, $\beta_2$, $\beta_3$ and $\beta_4$, as indicated in FIGS. 1–3. Likewise, coordination of arclengths $\beta_1$, $\beta_2$, $\beta_3$, $\beta_4$ may produce any prescribed motion of ARM 1 relative to ARM 2, with the exception of passing point M through point N. It is also possible to mix actuation of joint angles $\alpha_1$, $\alpha_2$, $\alpha_3$, and $\alpha_4$, and arclengths $\beta_1$, $\beta_2$, $\beta_3$ and $\beta_4$. A variety of methods will be discussed for achieving all of these actuation types.

Figure 22:
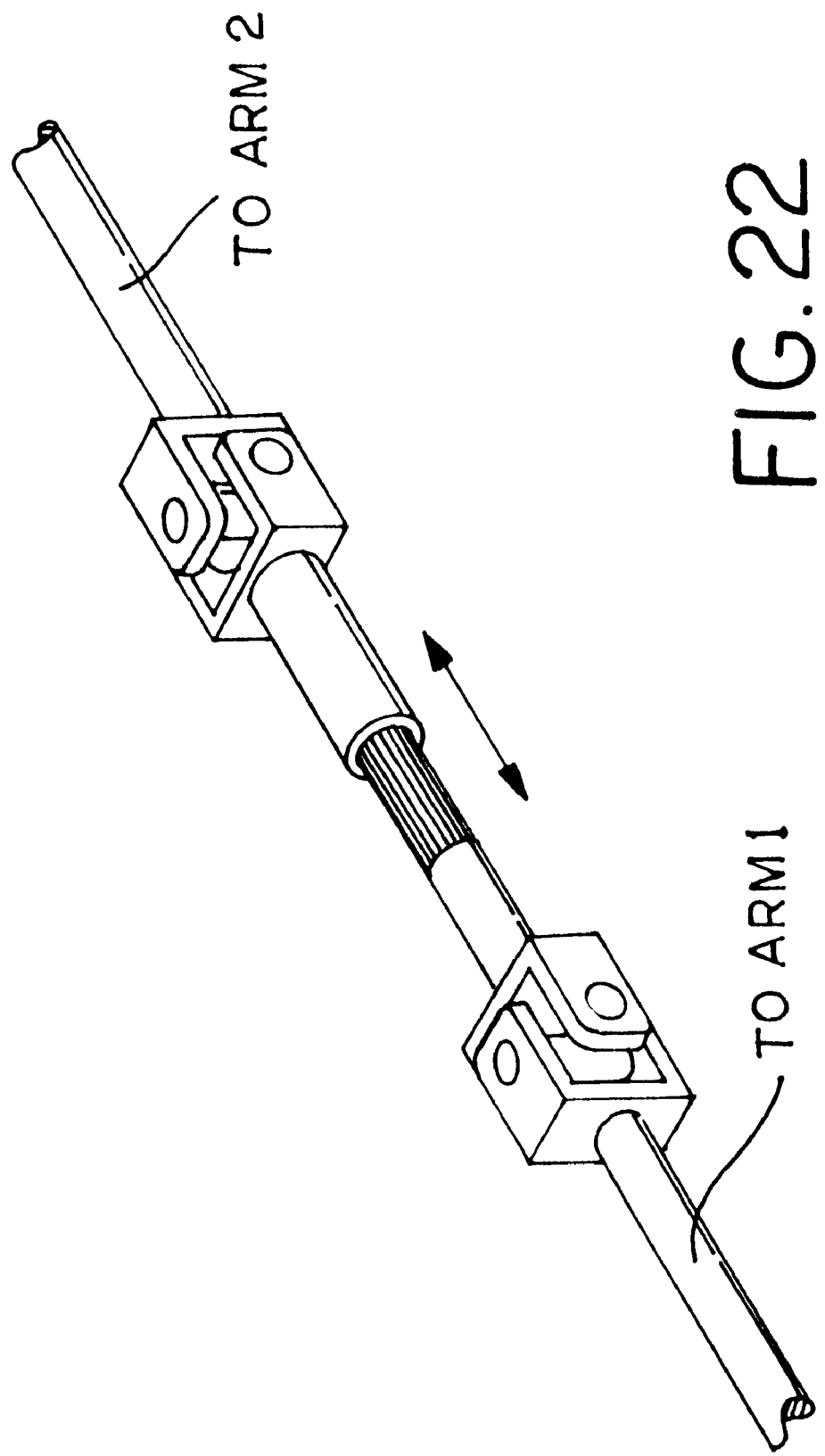
FIG. 22 is a fragmented perspective view of a telescoping double universal joint.

ARM 1 and/or ARM 2 may serve as a roll axis for a robot's end-effector, while the remaining arm or body of the joint may be rigidly connected to a forearm of a robot's arm subassembly. The arms may additionally telescope and/or serve as a roll axis to provide an elbow joint while maintaining the spherical nature of the inventive joint. ARM 1 and ARM 2 may be coupled together using a telescoping double universal joint, such as that shown in FIG. 22, which has two piggy-backed universal joints that telescope relative to one another on a shaft to provide a one-to-one rotation of the two arms. When the arms are coupled using the joint of FIG. 22, a roll actuation of ARM 1 produces a corresponding roll actuation of ARM 2. This allows for motors and controllers to be located remotely within the forearm and/or base of a robotic system while maintaining the ability to actively control joint motions and end effector orientation.

2. Semicircular Links

Figure 6:
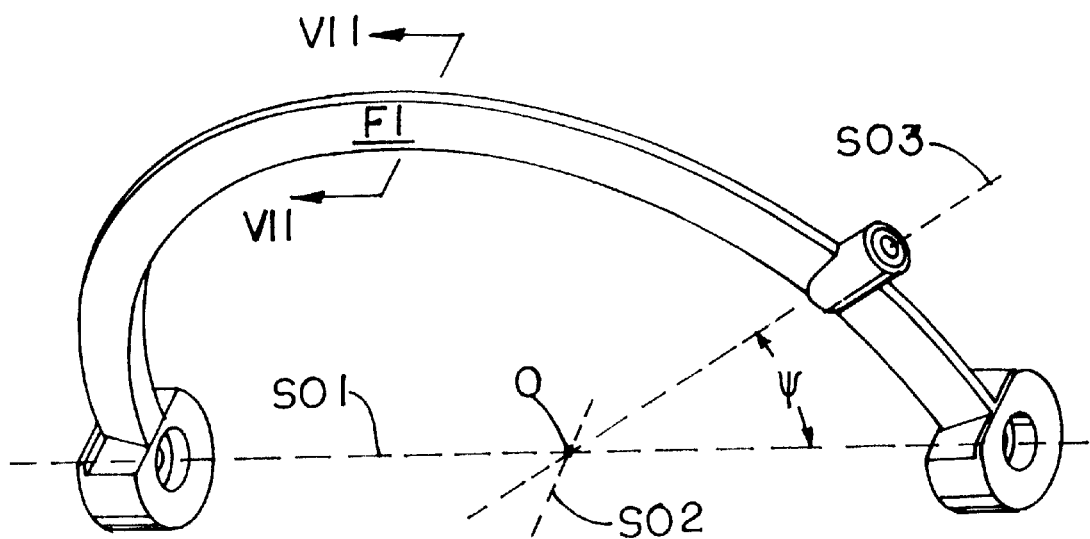
FIG. 6 is a perspective view of a solid rail cross section version of a semicircular link or hoop according to the present invention.
Figure 7:
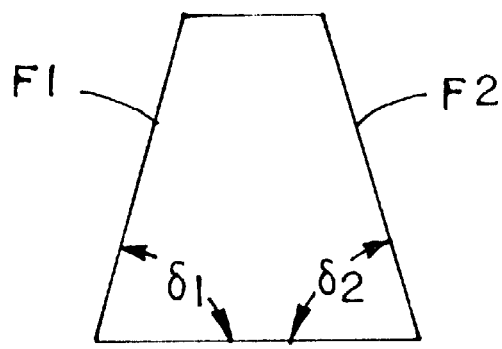
FIG. 7 is a cross sectional view taken substantially along line VII—VII of FIG. 6.

While many possible embodiments exist for the semicircular links, or hoops, in FIGS. 1–3, embodiments having prismatic quadrilateral cross-section will be explained in detail. FIG. 6 shows a solid rail semicircular link which pivots about axis SO1. Axis SO3 and the associated coaxial protrusion at an angular position of ψ relative to axis SO1 about axis SO2, are necessary to implement the kite linkage as will be described in further detail below. The cross-section of the link (FIG. 7) is a revolved protrusion about axis SO2. The characteristics of this cross section are determined from the height and width dimensions of the quadrilateral, as well as the bevel angle dimensions $\delta_1$ and $\delta_2$. When both $\delta_1$ and $\delta_2$ are less than 90°, the cross section bevels outwardly as its trapezoidal shape points outwardly from the link center. When both $\delta_1$ and $\delta_2$ are greater than 90°, the cross section bevels inwardly as its trapezoidal shape points inwardly toward the link center. When both $\delta_1$ and $\delta_2$ are equal to 90°, the rectangular cross section has no bevel. A mixture of the bevel angles being less than, greater than, or equal to 90°, while possible, does not seem to lend itself to favorable assembly or bearing configuration. A rectangular cross section ($\delta_1=\delta_2=90°$) would require bearings on a minimum of three of the four faces to support applied loads. The trapezoidal cross section ($\delta_1>90°$ and $\delta_2>90°$ or $\delta_1<90°$ and $\delta_2<90°$), however, can support applied loads with only two bearings, one in contact with each of the sloped faces F1 and F2 of the trapezoid. Isosceles trapezoidal cross sections ($\delta_2=\delta_2>90°$ or $\delta_1=\delta_2<90°$) possess advantages over the alternatives as the horizontal component of the bearing loads applied to the two sloped faces F1 and F2 will essentially statically cancel.

FIG. 8 shows a split rail semicircular link, or hoop, which pivots about axis SP1. Axis SP3 and the associated coaxial protrusion at an angular position of Ψ relative to axis SP1 about axis SP2, are necessary to implement the kite linkage as described in greater detail below. The cross section of a split rail link, as shown in FIG. 9, contains two quadrilateral rails, each similar to the cross section of the previously discussed solid rail link. This cross section is determined from the height and width dimensions of the two quadrilateral shapes, their separation, and the bevel angles $\delta_3$, $\delta_4$, $\delta_5$, and $\delta_6$. When all $\delta_3$, $\delta_4$, $\delta_5$, and $\delta_6$ are less than 90°, the cross sections bevel outwardly as the trapezoidal sections point outwardly from the link center. When all $\delta_3$, $\delta_4$, $\delta_5$, and $\delta_6$ are greater than 90°, the cross sections bevel inwardly as the trapezoidal sections point inwardly toward the link center. When all of the bevel angles equal 90°, the rectangular cross sections have no bevel.

A simple trapezoidal cross section ($\delta_3>90°$ and $\delta_6>90°$ or $\delta_3<90°$ and $\delta_6<90°$) could support applied loads with bearings on the exterior sloped faces F3 and F6, regardless of the interior bevel angles. However, this sort of configuration would tend to flex the two rails toward one another under an applied load. An alternative cross section ($\delta_4>90°$ and $\delta_5>90°$ or $\delta_4<90°$ and $\delta_5<90°$) has the ability to support applied loads with bearings on the interior sloped faces F4 and F5, regardless of the exterior bevel angles. However, this sort of configuration would tend to flex the two rails away from one another under an applied load. Alternatively, a double isosceles trapezoidal cross section ($\delta_3=\delta_4=\delta_5=\delta_6>90°$ or $\delta_3=\delta_4=\delta_5=\delta_6<90°$) would allow for bearing contact on all four of the sloped faces, where symmetry allows for all horizontal forces to essentially statically cancel. The potential also exists for matching the two outside bevel angles $\delta_3$ and $\delta_6$, and/or matching the two inside bevel angles $\delta_4$ and $\delta_5$.

As a given pair of semicircular links which mirror across the equator must physically attach to the central link of the system, two dimensionally unique links are used. As shown in FIGS. 16–19, one link is radially larger in size so that physical interference is avoided. Additionally, the isosceles trapezoidal cross section of the larger link is beveled outwardly, while the smaller is beveled inwardly to allow for simple preload configurations between the links as will be discussed in more detail herein. The potential does exist for devising the connection points of a pair of mirrored semicircular links, as well as passing or devising a pair of intersecting links through one another.

Solid rail semicircular links are easier to manufacture than split rail links and have lower material costs. However, solid rail links may require a non-zero angular offset of ARM 1 and ARM 2 from the lines connecting the point O to the points M and N in some embodiments, while split rail links permit ARM 1 and ARM 2 to pass coaxially with the lines connecting the point O to the points M and N as will become more apparent upon reading the following description of the carriages.

3. Carriages

Figure 10:
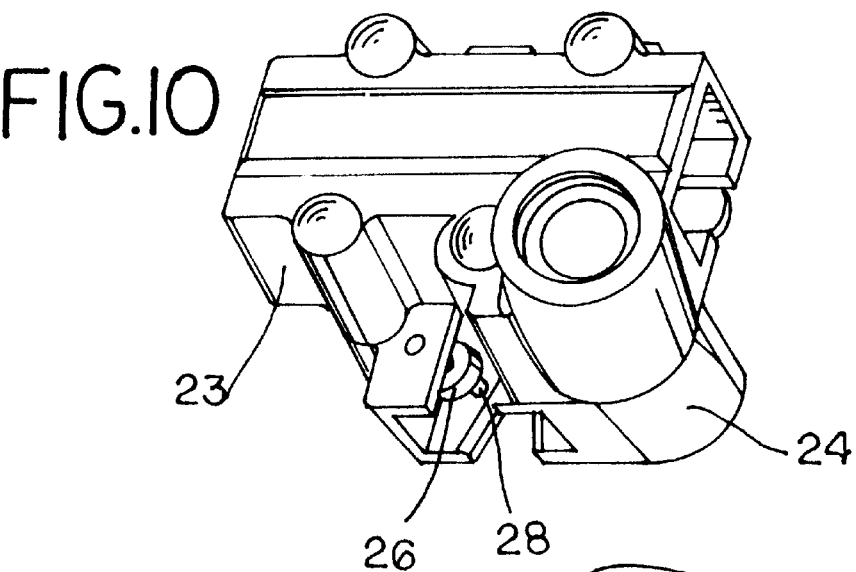
FIG. 10 is a perspective view of a carriage unit according to the present invention for connecting a pair of solid rail semicircular links in an adjustment hemisphere.
Figure 11:
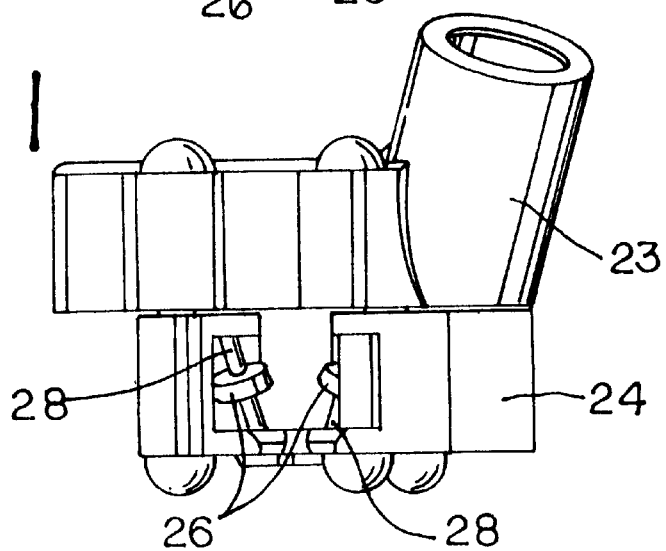
FIG. 11 is a front elevational view of the carriage unit of FIG. 10.
Figure 12:
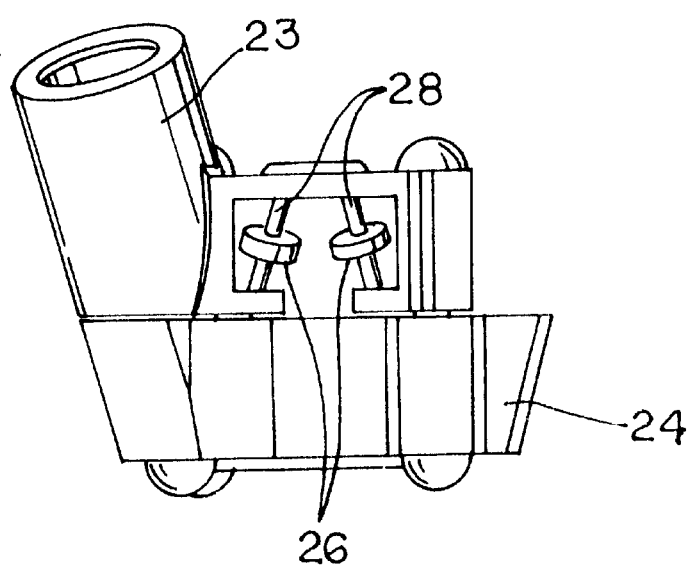
FIG. 12 is a right side elevational view of the carriage unit of FIG. 10.
Figure 13:
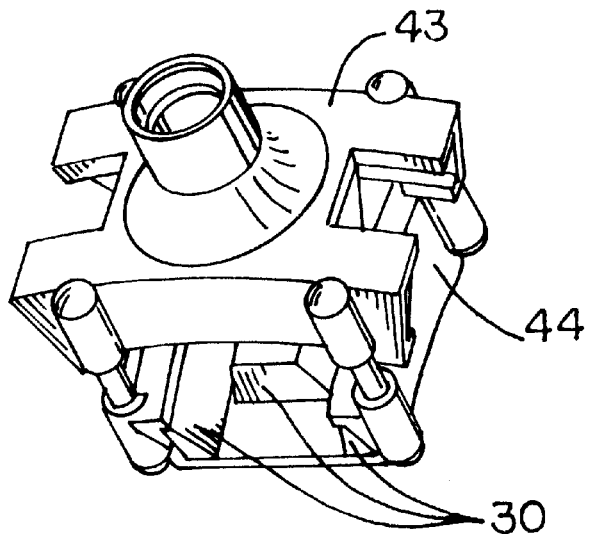
FIG. 13 is a perspective view of an alternate carriage unit according to the present invention for connecting a pair of split rail links in an adjustment hemisphere.
Figure 14:
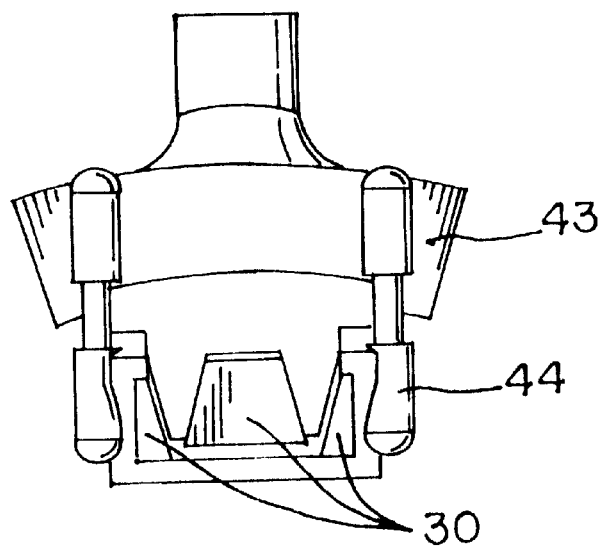
FIG. 14 is a front elevational view of the carriage unit of FIG. 13.
Figure 15:
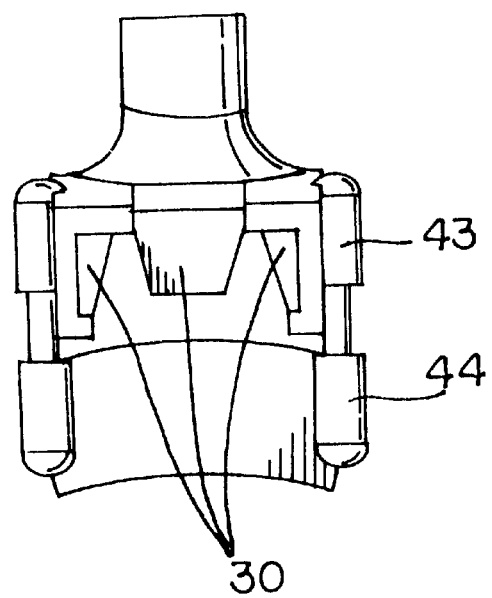
FIG. 15 is a right side elevational view of the carriage unit of FIG. 13.

FIGS. 10–12 show a carriage unit for connecting a pair of solid rail semicircular links, or hoops, in a given adjustment hemisphere. FIGS. 13–15 show a carriage unit which connects a pair of split rail semicircular links, or hoops, in a given adjustment hemisphere. A carriage unit consists of a carriage pair including a first carriage (either 24 or 44) which bears on an inner semicircular link, and a second carriage (either 23 or 43) which bears on an outer semicircular link. If these carriages are distinct physical entities, as they are depicted in the figures, mechanically fastening each adjacent pair of carriages into the effectively solid carriage unit enables the unit to enforce a constant angle between the links at their point of overlap. Such effectively solid carriage units impose, for example, an orthogonality condition on the point of overlap of their respective semicircular links. Although the possibility exists for a given carriage unit to be a single physical entity, complication increases in the unit's assembly and preload with an intersecting pair of semicircular links.

The carriage unit in FIGS. 10–12 utilizes ball bearings 26 mounted on shafts 28 with axes held parallel to the beveled faces or sides of the semicircular links to bear thereon. This configuration nearly achieves a rolling contact between the outer race of ball bearings 26 and the beveled faces of the links. Tapered roller bearings could be utilized to achieve a pure rolling contact at the full interface. Other interface solutions exist for the bearing action required between a carriage unit and pair of semicircular links including cylindrical rollers, balls in a groove, recirculating balls and bushing materials. Bushing materials are simple to implement and provide a low friction interface between carriage and semicircular link.

The carriage unit in FIGS. 13–15 utilizes a bushing material 30 which is formed to mate with the beveled faces of a pair of split rail semicircular links. Although bushing material 30 is shown in multiple sections attached to the carriage unit, one skilled in the art could readily employ a one-piece bushing material or a bushing formed integral to the carriage unit. The use of fasteners, compression springs, or other such devices to draw the carriages together enables either of the above described carriage units to take advantage of the reversed beveled cross sections of a pair of links as discussed in the previous section. Preloading in a single direction will draw the outer carriage inward and onto the outwardly beveled face of an outer semicircular link, while balancing this force by drawing the inner carriage outward and onto the inwardly beveled face of an inner semicircular link.

The carriage units bear ARM 1 and ARM 2. At least two ball bearings within each mechanically connected carriage unit are separated from one another to support thrust, radial, and moment loads applied to the arms. Alternatives to ball bearings exist for bearing the arms to the carriage units such as bushing materials, needle rollers, and the like. These ball bearings locate the arms such that their axes, A1 and A2, pass through system center point O, maintaining the spherical arrangement. The carriage unit depicted in FIGS. 10–12 constrains either ARM 1 or ARM 2 such that while their axes pass through the point O, they necessarily remain at a constant angular offset from the line connecting the point O to the points M or N, as was discussed previously as a necessary condition. Alternatively, the carriage unit depicted in FIGS. 13–15 constrains either ARM 1 or ARM 2 such that their axes remain coaxial with the lines connecting the point O to the points M or N. as is an available configuration when using split rail semicircular links.

4. Constraints and Methods of Actuation

In specific embodiments, the present invention provides a redundant pointing system in which four of the eight actuation parameters (the four joint angles $\alpha_1$, $\alpha_2$, $\alpha_3$, and $\alpha_4$, or the four arclengths $\beta_1$, $\beta_2$, $\beta_3$, and $\beta_4$) are required to produce a constrained motion of ARM 1 relative to ARM 2. In general, however, only two actuations are required to achieve this type of relative pointing motion of the arms.

As the system has two redundant actuations, two constraining relations or kinematic constraints are required between any of the four chosen actuation parameters. These two constraints could be implemented through controlling software, thus requiring a minimum of four actuating motors. Alternatively, the constraints may be implemented through hardware (e.g., gearing systems, linkages, tendons, and/or cables between actuations), thus requiring only two actuating motors.

Referring now to FIGS. 2 and 3, one constraint set is the requirement that the joint angles be related as $$\alpha_1 = \alpha_4 \quad (1)$$

and $$\alpha_2 = \alpha_3. \quad (2)$$

The implementation of equations (1) and (2) requires that the motions of the links L1 and L2 in the lower adjustment hemisphere "mirror" across the equator the motion of links L3 and L4 in the upper adjustment hemisphere. This constraint could be introduced in controlling software where the signals sent to actuate the motors controlling $\alpha_1$ and $\alpha_4$ produce equation (1), and those sent to the motors controlling $\alpha_2$ and $\alpha_3$ produce equation (2). Alternatively, hardware may be used to implement the "mirror" constraint of equations (1) and (2). Gearing systems, such as a miter gear box, could be used where one gear turns opposite another along a common axis coupled through a common pinion. Specifically, gearing would be required between links L1 and L4 about axis 1, and L2 and L3 about axis 4 of FIGS. 2 and/or 3.

Figure 4:
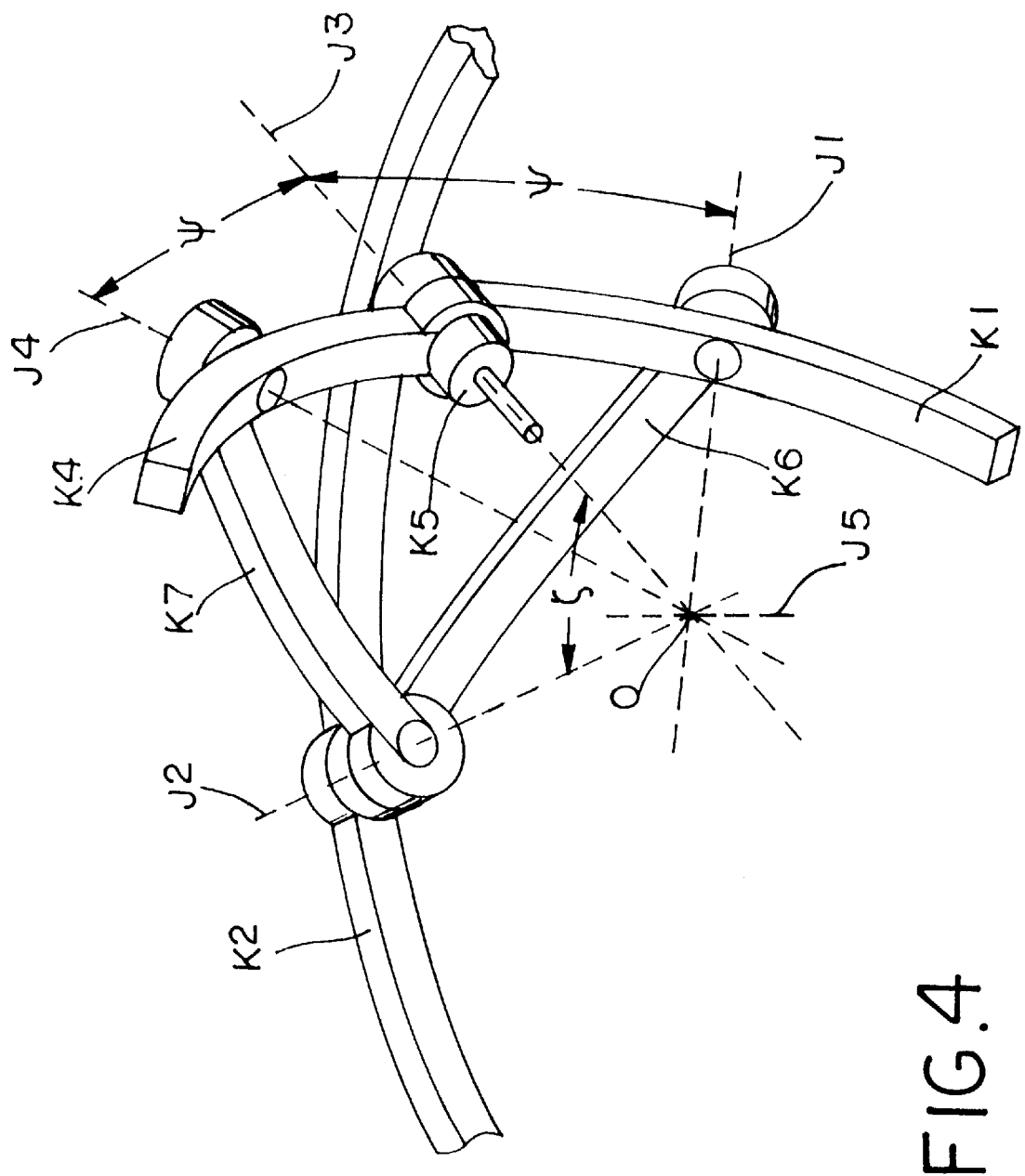
FIG. 4 is a fragmented perspective view of a double four-bar linkage according to the present invention, referred to as a kite linkage, for implementing a kinematic constraint to the systems in FIGS. 1, 2, or 3.
Figure 5:
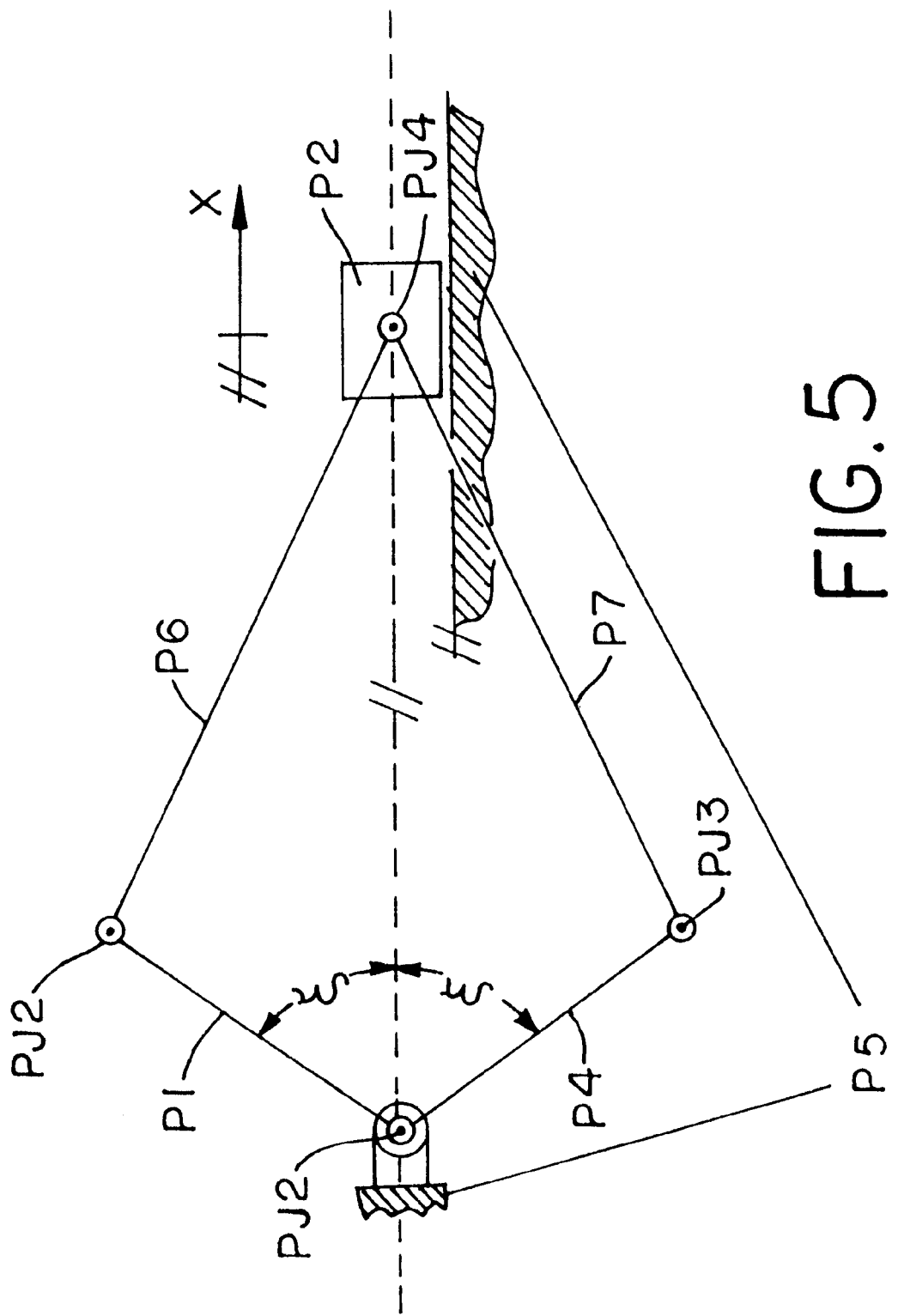
FIG. 5 is a schematic of a limiting case of the kite linkage of FIG. 4.

A hardware solution to constrain joint angles could also be imposed through the use of a double four-bar linkage such as the spherical kite linkage depicted in FIG. 4. For ease of introduction and understanding, refer to the limiting case of a planar kite linkage as shown schematically in FIG. 5. The planar linkage of FIG. 5 is a special or limiting case of the spherical linkage of FIG. 4, where the radii of the links approach infinity, and axes of link rotation intersect at infinity (i.e., are parallel). The planar kite linkage is a one input two output double four-bar linkage or crank slider. The single input of the mechanism is the actuation of the common slider block P2, which may slide in the positive or negative x-direction relative to link P5 as indicated in FIG. 5. Two equal length coupler links, P6 and P7, attach to and rotate relative to the slider block P2 at pin joint PJ4. Two equal length output links, P1 and P4, attach and rotate relative to link P5 at pin joint PJ1. Link P1 attaches and rotates relative to coupler link P6 at pin joint PJ2, as do links P4 and P7 at PJ3 as shown in FIG. 5.

As P2 is actuated in the x-direction, output links P1 and P4 "mirror" each other across the line connecting PJ1 and PJ4, which corresponds to the plane of the equator of the present joint. The angles $\xi$ between the output links and the line connecting PJ1 and PJ4 are thus equal. This is consistent with imposing the constraints in equations (1) and (2) above. The links P1 and P4 are analogous to either link pair L1 and L4, or link pair L2 and L3.

Understanding the underlying workings of the planar kite linkage simplifies the explanation of the general case of the spherical kite linkage in FIG. 4. The center of this spherical linkage coincides with the center O of the systems in FIGS. 2 and 3. This depiction of the kite linkage employs two spherical four-bar linkages, one consisting of links K1, K6, K2, and K5, and the other consisting of links K4, K7, K2, and K5. Link K5 represents a portion of the central equator link, link L5 in FIG. 2, or link L6 or L7 in FIG. 3. A pair of fragmented semicircular links K1 and K4 connect at link K5. Links K1 and K4 also pivot relative to K5 about axis J3. Link K5 is analogous to the link P5 in the above planar kite linkage explanation, while links K1 and K4 are the output links P1 and P4 of the single input spherical kite linkage.

Axes J1 and J4, which are offset from axis J3 by the constant angle $\psi$, determine the effective portion of links K1 and K4 which are used in the spherical four-bars. Input link K2 rotates relative to link K5 about axis J5 which is orthogonal to both axes J2 and J3. Link K6 and K7 are coupler links which rotate about and attach to link K2 along axis J2, and rotate and attach to links K1 and K4 along axes J1 and J4, respectively, as shown in FIG. 4. The input angle $\xi$ between axes J2 and J3, measured about axis J5, is analogous to the actuation of the common slider in the x-direction of the planar linkage depicted in FIG. 5. As the angle $\xi$ is varied, the double spherical four-bar linkage folds links K1 and K4 in unison so that they mirror one another across the plane defined by the intersecting axes J2 and J3 which represents the previously defined plane of the equator. It should be noted that ball joints could be utilized at one or more of the joints of the kite linkages as described above to account for misalignments and the reality of finite manufacturing precision.

Several methods of actuation exist for controlling the hardware solutions proposed for implementing the kinematic constraints in equations (1) and (2). Actuating motors could be applied directly to the miter gear systems discussed above. The motors could directly drive a single semicircular link or hoop of a given pair, while the other semicircular link would be driven through the miter gear system in a manner such that the pair move in mirror-image relationship across the equator. Although only a single miter gear system is necessary between a given pair of semicircular links, the use of gearing at both endpoints of the semicircular links pair increases rigidity and helps reduce backlash in the system. Likewise, motors could be applied directly to a given joint of a kite linkage which constrains a given pair of semicircular links. By directly controlling the relative rotation of a pair of jointed links in the kite linkage, a pair of semicircular links could be controlled to mirror across the equator. As discussed with the miter gear system above, only a single kite linkage is required between a given pair of semicircular links. However, system rigidity is improved by employing a pair of kite linkages.

Actuating motors could also be utilized to drive a cable or tendon system which could enforce the constraint equations (1) and (2). Motor driven push/pull rods could be used as an alternative to directly attaching actuating motors to the joint as discussed in the preceding statements. A fixed orientation of the point M or N in FIG. 2 and/or 3, and attachment of two jointed push/pull rods onto the central equator link L5 of FIG. 2, or one jointed push/pull rod onto each L6 and L7 of FIG. 3, would permit the rods to fully orient the equator relative to the fixed points M or N, so long as the line connecting these attachment points does not pass through the joint center O. Independent, unidirectional actuation of each push/pull rod, and the symmetric actuation discussed previously, would enable orientation of ARM 1 relative to ARM 2 with the exception of coincidence of points M and N. A minimum of two motors could be located outside the workspace of the joint, for example in the forearm or base of a robotic system, making the moving sections of such a system lighter and more stable.

Figure 23:
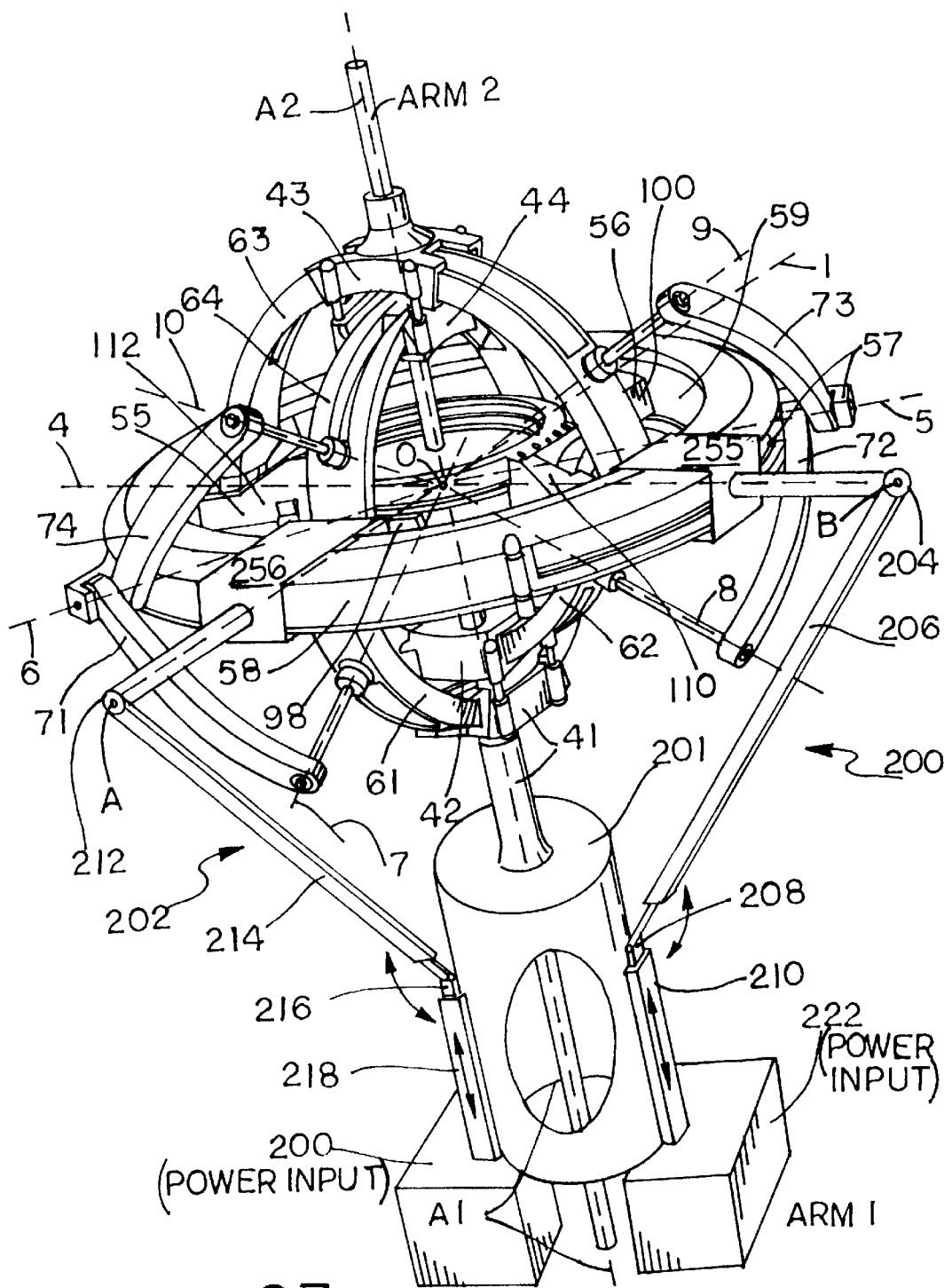
FIG. 23 is a partially fragmented perspective view of a split equator joint of the present invention using split rail semicircular links, kite linkages, and push/pull rods for actuation.

FIG. 23 shows such a pair of push/pull rods, generally designated 200, 202, for actuating a joint of the present invention having carriage 41 mounted in a fixed orientation on a pedestal 201 or forearm structure. Since rods 200, 202 are essentially identical, only one will be described in detail. Rod 200 includes a ball joint 204 which is connected to equator link 55 through a support bracket 255 which extends around slip rings 57, 58. A rod 206 connects ball joint 204 to a hinge 208. Hinge 208 is also connected to a slider rod 210, which is driven along its axis adjacent pedestal 201 by power input device 222, such as a motor. Actuation of push/pull rods 200, 202 moves equator links 55, 56 which causes corresponding movement of the kite linkages, thereby positioning ARM 1 relative to ARM 2, as will be further described herein.

The mirroring concept may also be achieved by imposing the constraints on the arclengths as $$\beta_1 = \beta_4 \quad (3)$$

and $$\beta_2 = \beta_3 \quad (4)$$

Similar to the joint angle actuation, only two of the arclength actuations are independent. Cables and/or tendons could be connected between intersection points M and N of FIGS. 2 and 3 along the semicircular links L1, L2, L3, and L4 to impose equations (3) and (4). Additionally, a pulley system could be incorporated into the cable and/or tendon network to increase the mechanical advantage of the actuation. Links L1 and L2 and/or links L3 and L4 could also be incorporated as portions of gears, thereby permitting easy actuation of the system arclengths.

It is possible to have a combined actuation of joint angles and arclengths. Any combination of two constraint equations from equations (1)-(4) could be implemented to mechanically constrain the system through software and/or hardware in the appropriate forms of programming, motors, wiring configurations, gearing, linkages, cables, tendons, and the like.

5. Full Embodiments

Figure 16:
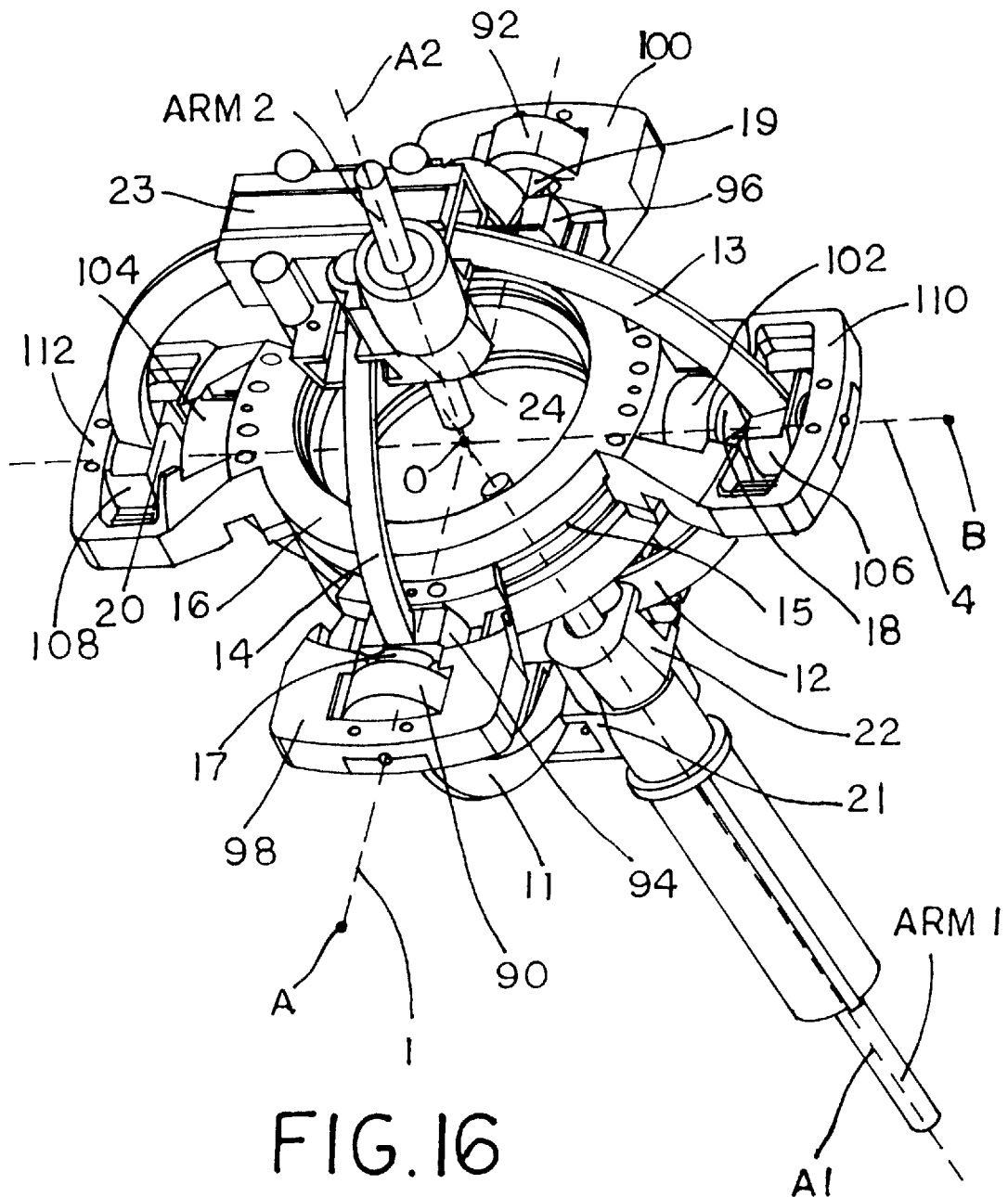
FIG. 16 is a perspective view of an embodiment of the present invention using miter gear packs and solid rail semicircular links.

FIG. 16 depicts a perspective view of an embodiment of a split equator joint according to the present invention. This embodiment utilizes miter gear packs to impose the symmetry constraint and solid rail semicircular links or hoops. The schematic links L1, L2, L3, and L4 of FIGS. 1–3 are embodied as semicircular links 11, 12, 13, and 14, respectively. The schematic central equator links L6 and L7 of FIG. 3 are embodied as concentric, circular, central equator links 15, 16, respectively. The schematic axes S1 and S4 of FIGS. 1–3, which are shown coincident and constrained to remain coincident in FIGS. 2 and 3, are likewise labeled common axis 1 in FIG. 16. The schematic axes S2 and S3 of FIGS. 1–3, which are shown coincident and constrained to remain coincident in FIGS. 2 and 3, are likewise labeled common axis 4 in FIG. 16. The intersecting axes 1 and 4 define the "plane of the 'equator,'" identical to that previously defined. Axes 1 and 4, which are associated with equator links 15, 16 respectively, pivot about their point of intersection (joint center O) in the plane of the equator.

Semicircular link pair 11 and 14 pivot on central equator link 15 about axis 1. Semicircular link 11 has a pair of ends 90, 92 and semicircular link 14 has a pair of ends 94, 96. Ends 90 and 94 connect to gear pack 17, which is connected to link 15 at pivot block 98. Ends 92 and 96 connect to gear pack 19, which is connected to link 15 at pivot block 100. Gear packs 17 and 19 are geared such that the motions of links 11 and 14 about axis 1 mirror each other across the equator. Semicircular link pair 12 and 13 pivot on central equator link 16 about axis 4. Semicircular link 12 has a pair of ends 102, 104 and semicircular link 13 has a pair of ends 106, 108. Ends 102 and 106 connect to gear pack 18, which is connected to link 16 at pivot block 110. Ends 104 and 108 connect to gear pack 20, which is connected to link 16 at pivot block 112. Gear packs 18 and 20 are also geared such that the motions of links 12 and 13 about axis 4 mirror each other across the equator.

Below the equator in FIG. 16, a lower adjustment hemisphere of the joint contains previously described links 11 and 12. Carriage 21 of the lower carriage unit bears on link 11, while carriage 22 bears on link 12. Above the equator, an upper adjustment hemisphere contains previously described links 13 and 14. Carriage 23 of the upper carriage unit bears on link 13, while carriage 24 bears on link 14. The carriages of each carriage unit fasten together to provide effectively solid carriage units as depicted in FIGS. 10–12. These carriage units impose an orthogonality condition at the points of overlap of links 11 and 12 in the lower adjustment hemisphere, and links 13 and 14 in the upper adjustment hemisphere.

Although any bearing interface between carriages and semicircular links may be permitted, the above-described carriages 21, 22, 23, and 24, bear on links 11, 12, 13, and 14 respectively, through the use of ball bearings mounted on shafts with axes held parallel to the outwardly beveled faces of links 11 and 13, and the inwardly beveled faces of links 12 and 14. In FIG. 16, the carriage units bear ARM 1 and ARM 2 through the use of ball bearings so that the axes A1 and A2 of ARM 1 and ARM 2 intersect at the joint center O. By articulating the mirroring link pairs 11, 14 and 12, 13, the lines passing through joint center O and the points of overlap of links 11, 12 and 13, 14, may be pointed nearly anywhere in the lower and upper adjustment hemisphere, respectively. Although the constant angular offset associated with solid rail links limits adjustability somewhat, as previously discussed, the joint maintains a maximized workspace.

Figure 17:
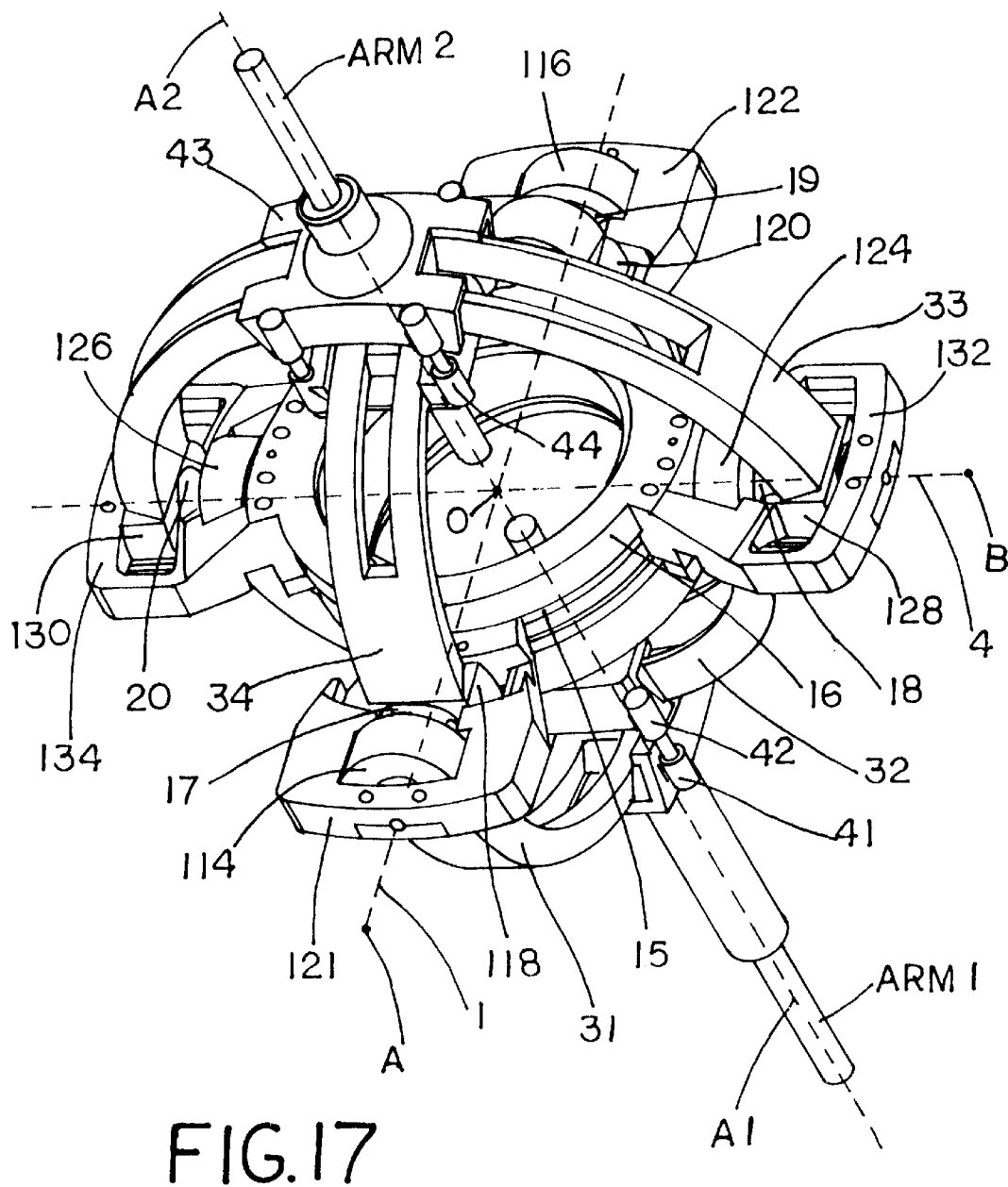
FIG. 17 is a perspective view of another embodiment of the present invention using miter gear packs and split rail semicircular links.

FIG. 17 depicts a perspective view of another embodiment of the present invention. This embodiment also employs miter gear packs to impose the symmetry constraint between semicircular links, but uses split rail links rather than solid links. The schematic links L1, L2, L3, and L4 of FIGS. 1–3 are embodied as semicircular links 31, 32, 33, and 34, respectively. The schematic central equator links L6, L7 of FIG. 3 are embodied as concentric, circular, central equator links 15, 16, respectively. The schematic axes S1 and S4 of FIGS. 1–3, which are shown coincident and constrained to remain coincident in FIGS. 2 and 3, are likewise labeled common axis 1. The schematic axes S2 and S3 of FIGS. 1–3 are labeled common axis 4. Like the joint of FIG. 16, intersecting axes 1 and 4 define the "plane of the 'equator'" and pivot joint center O as equator links 15 and 16 rotate relative to one another.

Semicircular links 31 and 34 pivot on central equator link 15 about axis 1. Link 31 has a pair of ends 114, 116, and link 34 has a pair of ends 118, 120. Ends 114 and 118 connect to gear pack 17, which is connected to equator link 15 at pivot block 121. Ends 116 and 120 connect to gear pack 19, which is connected to equator link 15 at pivot block 122. Gear packs 17 and 19 are geared such that the motions of links 31 and 34 about axis 1 mirror each other across the equator.

Semicircular links 32 and 33 similarly pivot on central equator link 16 about axis 4. Link 32 has a pair of ends 124, 126 and link 33 has a pair of ends 128, 130. Ends 124 and 128 connect to gear pack 18, which is connected to equator link 16 at a pivot block 132. Ends 126 and 130 connect to gear pack 20, which is connected to equator link 16 at pivot block 134. Gear packs 18 and 20 are geared such that the motions of links 32 and 33 about axis 4 mirror each other across the equator.

Below the equator in FIG. 17, a lower adjustment hemisphere of the joint contains previously described links 31 and 32. Carriage 41 bears on link 31, while carriage 42 bears on link 32. Above the equator, an upper adjustment hemisphere of the joint contains previously described links 33 and 34. Carriage 43 bears on link 33, while carriage 44 bears on link 34. The carriages 41, 42, 43, 44 fasten together into effectively solid carriage units as depicted in FIGS. 13–15. These carriage units impose an orthogonality condition at the points of overlap of links 31, 32 in the lower adjustment hemisphere, and links 33, 34 in the upper adjustment hemisphere.

Although any bearing interface between carriages and semicircular links may be used, both carriage units bear on the semicircular links through the use of bushing materials which correspond to the outwardly beveled faces of links 31, 33, and the inwardly beveled faces of links 32, 34. The lower carriage unit (carriages 41, 42) bears ARM 1 through the use of ball bearings so that its axis A1 passes through joint center O. The upper carriage unit (carriages 43, 44) similarly bears ARM 2. By articulating the mirroring link pairs 31, 34 and 32, 33, ARM 1 and ARM 2 may be pointed anywhere relative to one another in the lower and upper adjustment hemisphere, respectively. Since the Joint of FIG. 17 uses split rail semicircular links, the arms are mounted with a zero angular offset from the points of overlap of the links. Thus, the limited adjustability associated with solid rail links is avoided.

Figure 18:
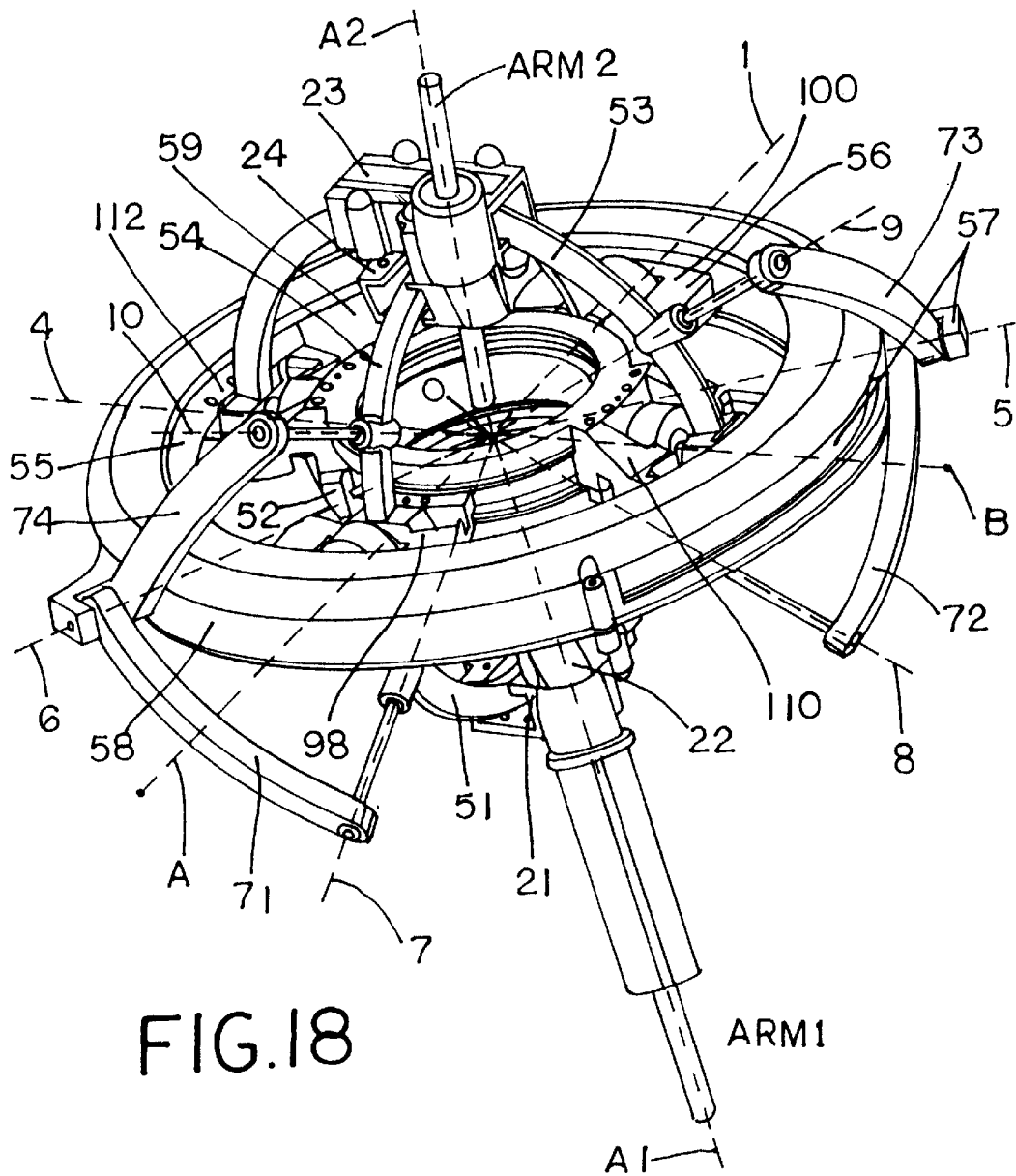
FIG. 18 is a perspective view of another embodiment of the present invention using kite linkages and solid rail semicircular links.

FIG. 18 depicts a perspective view of another embodiment of the present invention. This embodiment utilizes solid rail semicircular links and two of the previously described kite linkages to impose the symmetry constraint. The schematic links L1, L2, L3, and L4 of FIGS. 1–3 are embodied as semicircular links 51, 52, 53, and 54, respectively. The schematic central equator links L6, L7 of FIG. 3 are embodied as central equator links 56, 55, respectively, which are substantially similar to equator links 15, 16 of FIGS. 16 and 17. Unlike the equator links of the previous embodiments, equator link 55 includes a circular rail 59, centered on joint center O, connecting pivot blocks 110 and 112. Slip rings 57, 58 bear upon and rotate about circular rail 59 of equator link 55. The schematic axes S1 and S4 of FIGS. 1–3, which are shown coincident and constrained to remain coincident in FIGS. 2 and 3, are likewise labeled common axis 1 in FIG. 18. The schematic axes S2 and S3 of FIGS. 1–3 are labeled common axis 4. The intersecting axes 1 and 4, associated with equator links 56 and 55, respectively, define the "plane of the 'equator'" and pivot about joint center O.

The kite linkages of this embodiment are shown schematically in FIG. 4. The first kite linkage imposes a mirroring action on links 51 and 54 across the equator. Schematic links K1 and K4, which are attached to link K5 along axis J3 of FIG. 4, are embodied as links 51 and 54, respectively, attached to equator link 56 along axis 1 of FIG. 18. Schematic coupler links K6 and K7, which attach to and pivot about axes J1 and J4 on links K1 and K4 respectively of FIG. 4, are embodied as links 71 and 74 which attach to and pivot about axes 7 and 10 on links 51 and 54 respectively. Common link K2, which pivots about axis J5 of FIG. 4, is embodied as slip ring 58 which bears on circular rail 59 of equator link 55 and pivots about joint center O in the plane of the equator. Coupler links 71 and 74 pivot about axis 6 on slip ring 58.

The second kite linkage imposes a mirroring action on links 52 and 53 across the equator. Schematic links K1 and K4, which are attached to link K5 along axis J3 of FIG. 4, are embodied as links 52 and 53, respectively, attached to equator link 55 along axis 4 of FIG. 18. Schematic coupler links K6 and K7, which attach to and pivot about axes J1 and J4 on links K1 and K4 respectively of FIG. 4, are embodied as links 72 and 73 which attach to and pivot about axes 8 and 9 on links 52 and 53, respectively. Common link K2, which pivots about axis J5 of FIG. 4, is embodied as slip ring 57 which bears on circular rail 59 of equator link 55 and pivots about joint center O in the plane of the equator. Slip ring 57 is substantially housed within slip ring 58. However, a radial protrusion extends from slip ring 57 along axis 5 through a slot in slip ring 58. Links 72, 73 are pivotally supported by this radial protrusion.

Semicircular links 51 and 54 pivot about their ends (axis 1) within pivot blocks 98, 100 relative to central equator link 56. Links 51 and 54 connect to ball bearings mounted on shafts within pivot blocks 98, 100 such that the motions of links 51 and 54 about axis 1 mirror each other across the equator through the use of the first kite linkage as described above. Likewise, links 52 and 53 pivot about their ends (axis 4) within pivot blocks 110, 112 relative to central equator link 55. Links 52 and 53 connect to ball bearings mounted on shafts within pivot blocks 110, 112 such that the motions of 52 and 53 about axis 4 mirror each other across the equator through the use of the second kite linkage as described above.

Below the equator in FIG. 18, a lower adjustment hemisphere of the joint contains links 51 and 52. Carriage 21 bears on link 51, while carriage 22 bears on link 52. Above the equator, an upper adjustment hemisphere of the joint contains links 53 and 54. Carriage 23 bears on link 53, while carriage 24 bears on link 54. The carriages 21, 22, 23, 24 fasten together into effectively solid carriage units as depicted in FIGS. 10–12. These carriage units impose an orthogonality condition at the points of overlap of links 51, 52 in the lower adjustment hemisphere, and links 53, 54 in the upper adjustment hemisphere.

Although any bearing interface between carriages and semicircular links may be used, both carriage units bear on the semicircular links through the use of ball bearings, mounted on shafts, with axes held parallel to the outwardly beveled faces of links 51 and 53, and the inwardly beveled faces of links 52 and 54. The lower carriage unit (carriages 21, 22) bears ARM 1 through the use of ball bearings so that its axis A1 passes through joint center O. The upper carriage unit (carriages 23, 24) similarly bears ARM 2. By articulating the mirroring link pairs 51, 54 and 52, 53, ARM 1 and ARM 2 may be pointed nearly anywhere relative to one another in the lower and upper adjustment hemisphere, respectively. The constant angular offset of the the arms associated with a solid rail embodiment results in a slight limitation on adjustability, as previously discussed, yet the joint maintains a maximized workspace.

Figure 19:
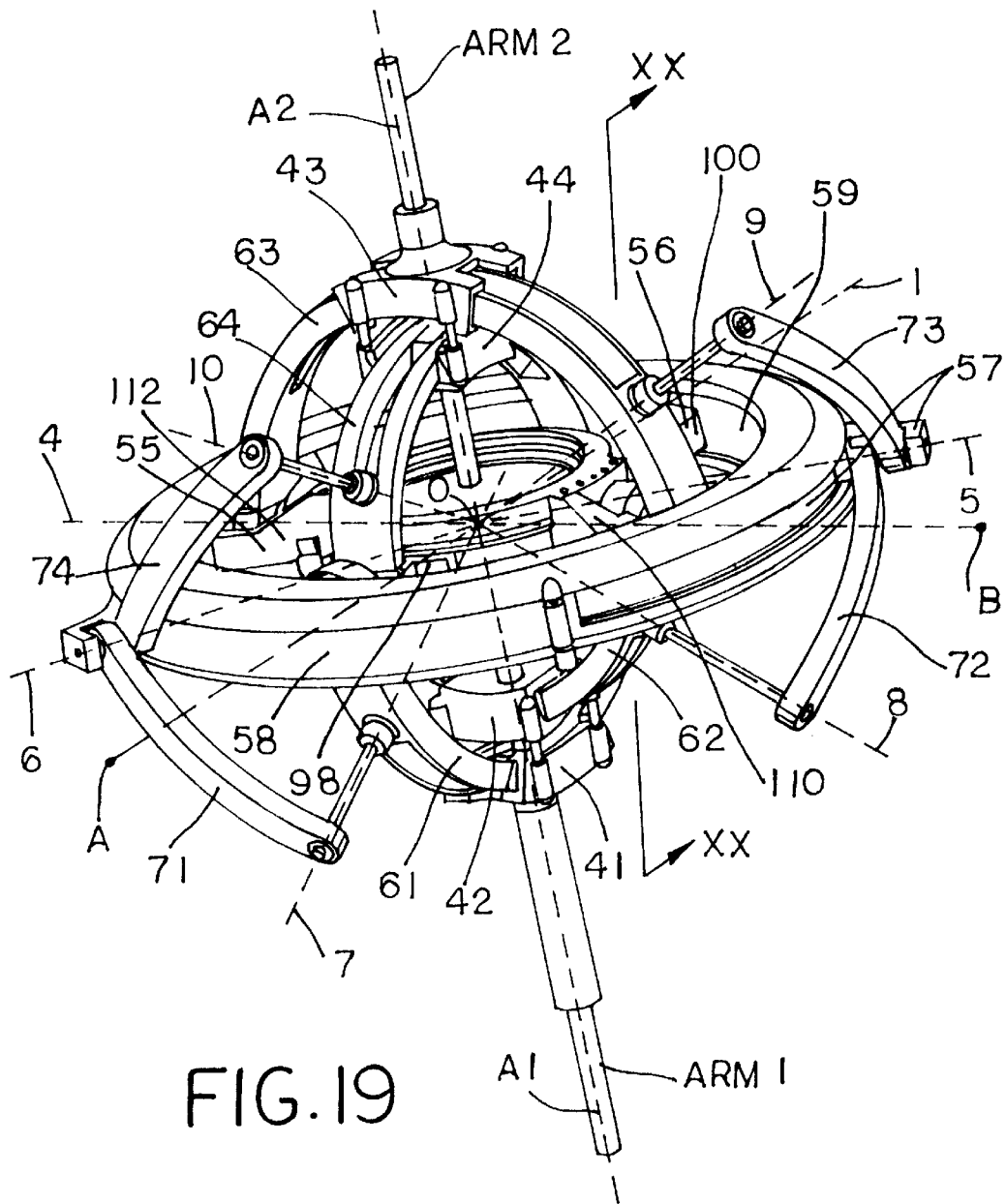
FIG. 19 is a perspective view of another embodiment of the present invention using kite linkages and split rail semicircular links.

FIG. 19 depicts a perspective view of another embodiment of the present invention. This embodiment also employs two kite linkages to impose the symmetry constraint, but uses split rail semicircular links instead of solid rail links. The schematic links L1, L2, L3, and L4 of FIGS. 1–3 are embodied as semicircular links 61, 62, 63, and 64, respectively. The schematic central equator links L6, L7 of FIG. 3 are embodied as concentric, circular, central equator links 56, 55, respectively. The schematic axes S1 and S4 of FIGS. 1–3, which are shown coincident and constrained to remain coincident in FIGS. 2 and 3, are likewise labeled common axis 1. The schematic axes S2 and S3 of FIGS. 1–3 are labeled common axis 4. The intersecting axes 1 and 4 associated with equator links 56 and 55 respectively, define the "plane of the 'equator'" and pivot about joint center O.

Figure 20:
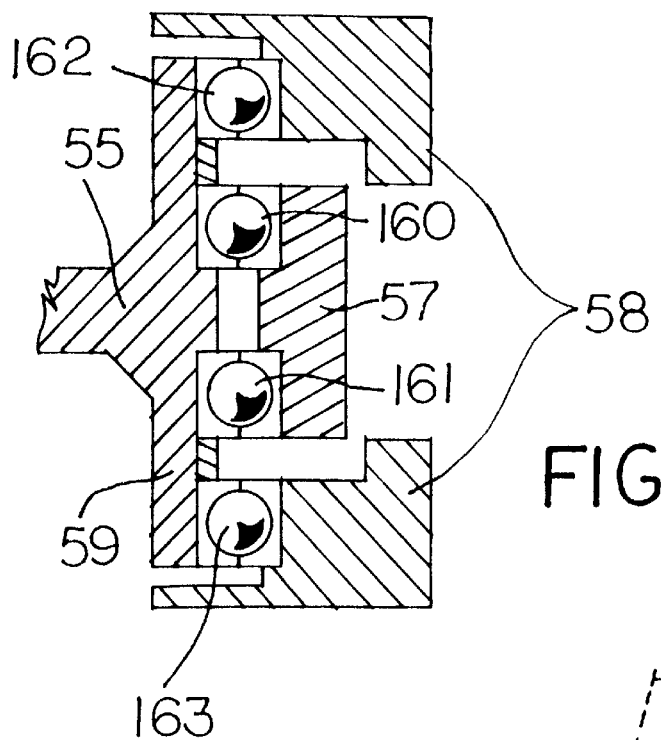
FIG. 20 is a partially fragmented, cross-sectional view taken substantially along line XX—XX of FIG. 19.

FIG. 20 depicts a cut-away cross-sectional view taken along line XX—XX of FIG. 19. This figure indicates how the circular slip rings 57, 58 associated with the two kite linkages of the embodiment of FIG. 19 attach to and operate with respect to the rest of the joint components. Slip ring 57, which is the link for the kite linkage enforcing a mirror constraint on links 62, 63, is located by and pivots relative to circular rail 59 of equator link 55 through the use of two ball bearings indicated by bodies 160, 161. Slip ring 58, which is the common link for the kite linkage enforcing a mirror constraint on links 61, 64, is located by and pivots relative to circular rail 59 of equator link 55 through the use of two ball bearings indicated by bodies 162, 163. Both slip rings 57, 58 have a diameter slightly greater than the diameter of circular rail 59 of equator link 55. While slip ring 57 may be an essentially solid ring, slip ring 58 is of two-piece construction. The pieces of slip ring 58 form a slot (best seen in FIG. 19) over a prescribed arclength to accommodate the radial protrusion of slip ring 57 which supports links 72, 73. Each of these slip rings are capable of independent rotation limited and controlled only by the proper actuation of the joint and ensuing articulations of the kite linkages.

Figure 21:
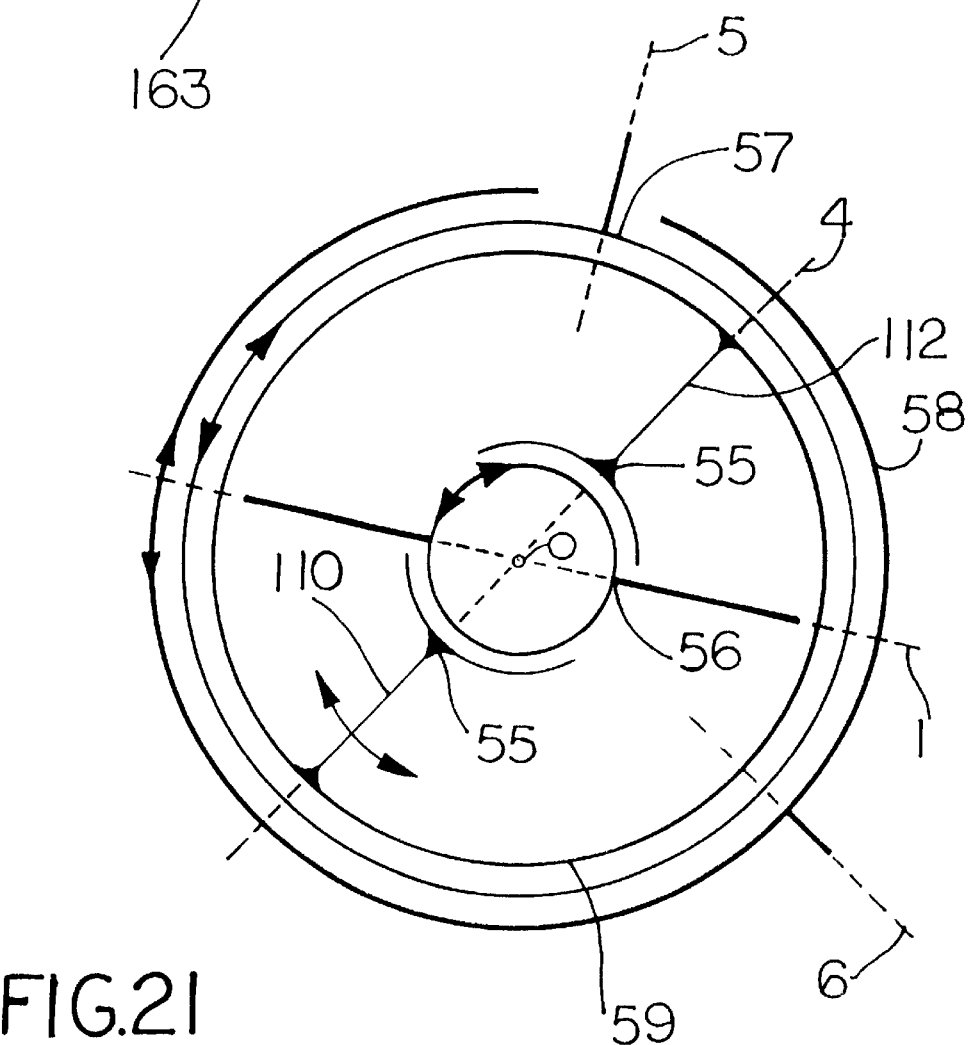
FIG. 21 is a conceptual diagram illustrating the relative pivotal movement of the joint of FIG. 19.

FIG. 21 further illustrates the rotational relationship between equator links 55, 56 and slip rings 57, 58, all in the biplane of the equator. Link 56 rotates about joint center O relative to link 55. Circular rail 59 of link 55 is shown connecting the radially outwardly projecting pivot blocks 110, 112. Both slip rings 57, 58 rotate on circular rail 59 of equator link 55. The radial protrusion of slip ring 57 extends along axis 5 through the slot in slip ring 58. Slip ring 58 also carries a radial protrusion which extends along axis 6 and supports links 71, 74 of the kite linkage that actuates links 61, 64 shown in FIG. 19.

The first kite linkage (links 71, 74 corresponding to K6, K7 of FIG. 4) imposes a mirroring action across the equator on links 61 and 64, which are attached to equator link 56 along axis 1. Links 71 and 74 attach to and pivot about axes 7 and 10 on links 61 and 64, respectively. Common link K2, which pivots about axis J5 of FIG. 4, is embodied as slip ring 58 which bears on circular rail 59 of equator link 55 and pivots about the joint center O in the plane of the equator. Links 71 and 74 pivot about axis 6 on slip ring 58.

The second kite linkage (links 72 and 73 corresponding to K6 and K7 of FIG. 4) imposes a mirroring action across the equator on links 62 and 63, which are attached to equator link 55 along axis 4. Links 72 and 73 attach to and pivot about axes 8 and 9 on links 62 and 63 respectively. Common link K2, which pivots about axis J5 of FIG. 4, is embodied as slip ring 57 which bears on circular rail 59 of equator link 55 and pivots about the joint center O in the plane of the equator. Links 72 and 73 pivot about axis 5 on slip ring 57.

Semicircular link 61 and 64 pivot about their ends (axis 1) within pivot blocks 98, 100 on central equator link 56. Links 61 and 64 connect to ball bearings mounted on shafts within pivot blocks 98, 100 with axes which are coincident with axis 1 such that the motions of links 61 and 64 about axis 1 mirror each other across the equator through the use of the first kite linkage as described above. Likewise, semicircular links 62 and 63 pivot about their ends (axis 4) within pivot blocks 110, 112 on central equator link 55. Links 62 and 63 connect to ball bearings mounted on shafts within pivot blocks 110, 112 with axes which are coincident with axis 4 such that the motions of links 62 and 63 about axis 4 mirror each other across the equator through the use of the second kite linkage.

Below the equator in FIG. 19, the lower adjustment hemisphere of the joint contains links 61, 62. Carriage 41 bears on link 61, while carriage 42 bears on link 62. In the upper adjustment hemisphere, carriage 43 bears on link 63, while carriage 44 bears on link 64. The carriages 41, 42, 43, 44 fasten together into effectively solid carriage units as depicted in FIGS. 13–15. These carriage units impose an orthogonality condition at the points of overlap of links 61, 62 in the lower adjustment hemisphere, and links 63, 64 in the upper adjustment hemisphere. Although any bearing interface between carriages and semicircular links may be permitted, carriages 41, 42, 43, and 44, bear on links 61, 62, 63, 64, respectively, through the use of bushing materials which correspond to the outwardly beveled faces of links 61 and 63, and the inwardly beveled faces of links 62 and 64. The carriage units defined by carriage pairs 41, 42, and 43, 44, bear ARM 1 and ARM 2, respectively, through the use of ball bearings so that their axes A1 and A2 intersect at the joint center O. By articulating the mirroring link pairs 61, 64 and 62, 63, ARM 1 and ARM 2 may be pointed anywhere in their respective hemispheres, as there is a zero angular offset associated with a split rail embodiment, as previously discussed.

Two potential methods for actuating the double pointing action of the inventive joint as embodied in previously described FIGS. 16–19 are envisioned. The first entails locating the actuating motors such that they directly drive the gear packs 17 and/or 19, and 18 and/or 20 of FIGS. 16 and 17, or each of the one degree-of-freedom kite linkages in FIGS. 18 and 19. Driving these gear packs or linkages would provide controlled motion of ARM 1 relative to ARM 2 by articulating semicircular link pairs toward and away from one another in mirrored relationship about their common axis of rotation. The second envisioned method, shown in FIG. 23, entails maintaining a single carriage unit in either hemisphere of the joints embodied in FIGS. 16–19 in a fixed orientation, and using two actuating motors to drive push/pull rods as described above.

One example of the first type of actuation may be examined with respect to FIG. 16. This entails actuating motors being applied to links 11 and 14 at gear packs 17 and/or 19 which would cause links 11 and 14 to rotate about axis 1, with respect to link 15, in a mirror image relationship across the plane of the equator. This actuation will cause carriage unit 21, 22 in the lower hemisphere to travel along link 12 and carriage unit 23, 24 in the upper hemisphere to travel along link 13. Thus, ARM 1 and ARM 2 would move along arcuate paths corresponding to semicircular links 12 and 13. Likewise, actuating motors applied to links 12 and 13 at gear packs 18 and/or 20 would cause links 12 and 13 to rotate about axis 4. Accordingly, carriage unit 21, 22 in the lower hemisphere travels along link 11 and carriage unit 23, 24 in the upper hemisphere travels along link 14. Thus, ARM 1 and ARM 2 would move along semicircular links 11 and 14. Therefore, directly driving gear packs 17, 18, 19, and 20 controls the actuation of semicircular links 11, 12, 13, and 14, which in turn determines the pointing orientation of ARM 1 relative to ARM 2.

Another example of the first type of actuation may be examined with respect to FIG. 18. One actuating motor could be used to drive one of the two kite linkages by connecting the motor at axes 1, 6, 7 or 10, which would cause the kite linkage to articulate such that links 51 and 54 would rotate about axis 1 in a mirror image relationship across the plane of the equator. This articulation will cause carriage unit 21, 22 in the lower hemisphere to travel along link 52 and carriage unit 23, 24 in the upper hemisphere to travel along link 53. ARM 1 and ARM 2 would likewise travel along links 52 and 53. Another motor could be connected at axes 4, 5, 8 or 9, and used to articulate the other kite linkage such that links 52 and 53 rotate about axis 4. This articulation will cause carriage units 21, 22 and 23, 24, and ARMS 1 and 2 to travel along links 51 and 54. Therefore, directly driving each of the kite linkages in FIG. 18 controls actuation of the semicircular links and the relative positioning of ARM 1 and ARM 2.

An example of the second type of actuation is shown in FIG. 23. In this embodiment, the carriage unit in the lower adjustment hemisphere (carriages 41, 42) is fixed in space with respect to the remaining links of the joint, thereby corresponding to a forearm of a wrist or base of a robotic arm's shoulder joint, shown as pedestal 201. There are two jointed push/pull rod assemblies generally designated 200 and 202. The first push/pull rod 200 includes a ball joint 204 which connects to a radial bracket 255 along axis 4 at the point B. Radial bracket 255 is fixedly connected to equator link 55 such that it does not interfere with slip rings 57, 58 of the embodiment's kite linkages. Coupler link 206 is connected between ball joint 204 and a hinge joint 208. Hinge joint 208 connects coupler link 206 to drive link 210 which is linearly actuated by power source 222. The second push/pull rod is similarly connected to equator link 56 and powered by power source 220.

Power sources 222, 220 may be rack and pinion drives, ball screw drives, acme screw drives, hydraulic and pneumatic cylinders, and the like. Additionally, hinge joints 208, 216 could be replaced by spherical joints (although kinematically not necessary) to accommodate misalignments in assembly and/or manufacturing of the joint components. Additionally, the function of push/pull rod assemblies 200, 202 could be accomplished by providing a prismatic action between point A and a position on body 41, and point B and a position on body 41.

As power sources 222, 220 drive push/pull rods 200, 202, points A and B travel relative to fixed carriages 41, 42 which are supported by pedestal 201 on true circular arcs centered at joint center O. As power source 222 drives push/pull rod assembly 200, point B travels up and down its circular arc, thereby changing the orientation of the plane of the equator relative to link 61 about axis 1. As the angle between the equator and the plane of link 61 articulates, kite linkage coupler link 71 causes slip ring 58 to rotate on circular rail 59 relative to equator link 55 in the plane of the equator. The rotation of slip ring 58 drives coupler link 74 so that link 64 pivots about axis 1 in mirror image relationship to link 61 across the equator. Throughout this motion, link 62 remains connected to equator link 55 at axis 4, and thus travels through fixed carriage 42 in the lower adjustment hemisphere. Likewise, the mirroring link 64 in the upper adjustment hemisphere moves carriages 43, 44 along link 63, thereby pointing ARM 2 relative to ARM 1.

Similarly, as power source 220 drives push/pull rod assembly 202, point A travels up and down its circular arc, thereby changing the orientation of the plane of the equator relative to link 62 about axis 4. As the angle between the equator and the plane of link 62 articulates, kite linkage coupler link 72 causes slip ring 57 to rotate on circular rail 59 relative to equator link 55 in the plane of the equator. The rotation of the slip ring 57 drives coupler link 73 so that link 63 pivots about axis 4 in mirror image relationship to link 62 across the equator. Throughout this motion, link 61 remains connected to the equator link 56 at axis 1 and travels through fixed carriage 41 in the lower adjustment hemisphere. Mirroring link 53 in the upper adjustment hemisphere moves carriages 43, 44 along link 64, thereby pointing ARM 2 relative to ARM 1.

Therefore, push/pull rod articulation as described herein may actuate the carriage unit in the upper adjustment hemisphere (carriages 43, 44) along links 63 and 64 relative to the fixed carriage unit in the lower adjustment hemisphere (carriages 41, 42) as links 61 and 62 travel through carriages 41 and 42, thus providing for a controlled pointing actuation of ARM 2 relative to ARM 1. With this type of actuation, the kite linkages (or gear packs depending on specific embodiments) are substantially passive, not directly driven by motors, yet maintaining the mirror image relationship of the pairs of links across the plane of the equator.

It should be apparent from the foregoing that ARM 2 of FIG. 23 may be positioned anywhere in the upper adjustment hemisphere, not just along the two arcuate paths defined by links 63 and 64 as they are shown in FIG. 23. Combined articulation of push/pull rods 200, 202 causes equator links 55, 56 to rotate about joint center O in a "scissoring" action relative to one another. Since the angle of overlap between links 63 and 64 is fixed by carriages 43, 44 and the angle of overlap between links 61 and 62 is fixed by carriages 41, 42, in order for ARM 2 to be positioned, for example, substantially perpendicular to the plane of the page adjacent the equator at a location directly between brackets 255, 256, equator links 55 and 56 must rotate or "scissor" in opposite directions to decrease the distance between pivot block 110 and pivot block 98 (best shown in FIG. 18). Similarly, when push/pull rods are articulated to position ARM 2 adjacent the equator at a location between pivot blocks 98 and 112, equator links 55 and 56 rotate in opposite directions to increase the distance between pivot blocks 110 and 98, thereby decreasing the distance between pivot blocks 98 and 112.

In addition to pointing, the joints in FIGS. 16–19 may also provide a roll component of actuation to ARM 1 and/or ARM 2 relative to the carriages upon which they bear. If independent roll motions of ARM 1 and ARM 2 are desired, a minimum of two motors would be required to actively roll each element. Alternatively, ARM 1 and ARM 2 may be coupled through a telescoping double universal joint, shown in FIG. 22, which would enable a one-to-one roll motion between the elements. More specifically, if a pair of the embodied joints were part of a robotic assembly (e.g., a shoulder and wrist joint), the carriage unit in the lower hemisphere of FIGS. 16–19 could represent the base and forearm, respectively. Pointing of ARM 2 relative to ARM 1 in each joint could be accomplished through two pairs of independently controlled push/pull rods, as previously described. ARM 2 of the shoulder joint and ARM 2 of the wrist joint could be coupled to their respective ARM 1 through telescoping double universal joints. The roll of the shoulder's ARM 2 could permit control of an elbow joint which would connect to the forearm of the wrist joint. The roll of the wrist's ARM 2 would permit positioning and orientation of a gripper and/or end effector of the robotic system. A system setup such as this would permit the location of motors and controllers remotely within the system's base and forearm for the shoulder and wrist joint respectively, making the moving parts of the system lightweight and more agile due to the potential for improved inertial properties.

6. Miscellaneous Details

Low friction bearing surfaces are preferably provided between all contact surfaces of relatively moving bodies to minimize the required actuating forces and/or torques. Low friction surfaces may be attained through bushing materials such as Delrin (R), Teflon (R), ultra high molecular weight polyethylene, oil impregnated bronze and similar materials. Friction at joints and/or pins may be reduced using self-lubricating metal/plastic bearings or rolling element bearings.

There is no preferred material for the construction of this invention. When great precision is necessary, a high strength material should be used. When compliance is necessary, a more flexible material would be allowable. Various operating possibilities and/or conditions will impose different requirements on the system, e.g. high or low temperature, necessary operating speeds, moisture conditions, hazardous surroundings, impact loadings and the like, thus dictating potential construction materials. Once constructed, a given joint should have the ability to operate in a myriad of similar working conditions.

Of course, the axes, bodies, and/or points described in all the foregoing as "intersecting," "orthogonal," and/or as "coincident," need not be precisely so to be within the scope of this invention. Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A mechanical joint, comprising:
   a center linkage including a first and second center link, each rotatable about a rotation point;
   a first link having a pair of ends pivotally coupled to the first center link to pivot about a first axis passing through the rotation point;
   a second link having a pair of ends pivotally coupled to the second center link to pivot about a second axis passing through the rotation point;
   a third link having a pair of ends pivotally coupled to the first center link to pivot about a third axis passing through the rotation point;
   a fourth link having a pair of ends pivotally coupled to the second center link to pivot about a fourth axis passing through the rotation point;
   a first carriage unit interconnecting the first and second links at a fixed angle at a first point of overlap; and
   a second carriage unit interconnecting the third and fourth links at a fixed angle at a second point of overlap.

2. The joint of claim 1 wherein the first and third axes are coaxial, thereby defining a first common axis, and the second and fourth axes are coaxial, thereby defining a second common axis.

3. The joint of claim 1 wherein the first and second center links are concentric circular links.

4. The joint of claim 1 wherein the first and second center links intersect at the rotation point.

5. The joint of claim 1 wherein the first and third axes are non-coaxial and the second and fourth axes are non-coaxial.

6. The joint of claim 1 further comprising a first arm supported by the first carriage unit having an axis passing through the rotation point, and a second arm supported by the second carriage unit having an axis passing through the rotation point.

7. The joint of claim 1 wherein the fixed angle between the first and second links is ninety degrees and the fixed angle between the third and fourth links is ninety degrees.

8. The joint of claim 1 wherein the first, second, third, and fourth links are semicircular hoops, each having a substantially constant radius from the rotation point.

9. The joint of claim 1 wherein each of the first, second, third, and fourth links is pivotable through an adjustment hemisphere.

10. The joint of claim 1 wherein the first and second links are pivotable through a first adjustment hemisphere and the third and fourth links are pivotable through a second adjustment hemisphere.

11. The joint of claim 1 wherein the rotation point is disposed at the center of the center linkage.

12. The joint of claim 1 wherein each of the first, second, third, and fourth links has a quadrilateral cross-section between its ends.

13. The joint of claim 1 wherein each of the first and fourth links has a pair of opposed sides which converge with distance from the rotation point and each of the second and fourth links has a pair of opposed sides which diverge with distance from the rotation point.

14. The joint of claim 1 wherein each of the first, second, third, and fourth links includes a slot between parallel rails extending between the ends of the links, each of the parallel rails having a quadrilateral cross-section.

15. The joint of claim 6 further comprising a double universal joint having one end connected to the first arm and another end connected to the second arm.

16. The joint of claim 6 wherein the first arm axis is offset from the first point of overlap and the second arm axis is offset from the second point of overlap.

17. The joint of claim 6 wherein the first arm axis passes through the first point of overlap and the second arm axis passes through the second point of overlap.

18. The joint of claim 8 wherein the first link is radially larger than the second link, and the fourth link is radially larger than the third link.

19. The joint of claim 8 wherein the first link is radially larger than the second link, and the third link is radially larger than the fourth link.

20. The joint of claim 2 further comprising an actuator in operable association with the center linkage and the first, second, third, and fourth links for controllably rotating the first and second center links about the rotation point, and controllably pivoting the first and third links about the first common axis, and the second and fourth links about the second common axis.

21. The joint of claim 2 further comprising a first gear constraint connected to the first and third links to constrain the pivotal movement of the links about the first common axis so that the first and third links pivot in mirror image relationship to one another, and a second gear constraint connected to the second and fourth links to constrain the pivotal movement of the links about the second common axis so that the second and fourth links pivot in mirror image relationship to one another.

22. The joint of claim 21 wherein the first gear constraint includes a first gear pack connected to one end of the first link and one end of the third link and a second gear pack connected to the other end of the first link and the other end of the third link, and the second gear constraint includes a third gear pack connected to one end of the second link and one end of the fourth link and a fourth gear pack connected to the other end of the second link and the other end of the fourth link.

23. The joint of claim 2 further comprising a first kite linkage for constraining the movement of the first and third links so that the first and third links pivot in mirror image relationship relative to one another about the first common axis, and a second kite linkage for constraining the movement of the second and fourth links so that the second and fourth links pivot in mirror image relationship relative to one another about the second common axis.

24. The joint of claim 13 wherein the first carriage unit includes a first carriage which bears upon a convergent side of the first link and a second carriage which bears upon a divergent side of the second link, and the second carriage unit includes a third carriage which bears upon a convergent side of the fourth link and a second carriage which bears upon a divergent side of the third link.

25. The joint of claim 14 further comprising a first arm supported by the first carriage unit extending through the slots of the first and second links, the first arm having an axis passing through the rotation point, and a second arm supported by the second carriage unit extending through the slots of the third and fourth links, the second arm having an axis passing through the rotation point.

26. The joint of claim 20 wherein the actuator includes a first push/pull rod connected to the first center link and a second push/pull rod connected to the second center link.

27. The joint of claim 23 wherein the first kite linkage includes a first slip ring supported by the center linkage for rotation about the rotation point, and a first pair of coupler links connected between the first slip ring and the first and third links, and the second kite linkage includes a second slip ring supported by the center linkage for rotation about the rotation point, and a second pair of coupler links connected between the second slip ring and the second and fourth links.

28. The joint of claim 27 wherein the first pair of coupler links are pivotally connected at one end to the first slip ring, one coupler link of the first pair of coupler links being pivotally connected at the other end to the first link, the other coupler link of the first pair of coupler links being pivotally connected at the other end to the third link, and the second pair of coupler links are pivotally connected at one end to the second slip ring, one coupler link of the second pair of coupler links being pivotally connected at the other end to the second link, the other coupler link of the second pair of coupler links being pivotally connected at the other end to the fourth link.

29. A mechanical joint, comprising:
a first center link being rotatable about a rotation point;
a second center link coupled to the first center link being rotatable about the rotation point and relative to the first center link;
a first hoop pivotally coupled to the first center link to pivot about a first axis passing through the rotation point; and
a second hoop pivotally coupled to the second center link at a fixed angle relative to the first hoop to pivot about a second axis passing through the rotation point.

30. The joint of claim 29 further comprising a third hoop pivotally coupled to the first center link to pivot about a third axis passing through the rotation point.

31. The joint of claim 29 further comprising a first carriage unit interconnecting the first and second hoops at the fixed angle, the first carriage unit supporting a first arm having an axis passing through the rotation point.

32. The joint of claim 30 further comprising a fourth hoop pivotally coupled to the second center link at a fixed angle relative to the third hoop to pivot about a fourth axis passing through the rotation point.

33. The joint of claim 31 wherein each of the first and second hoops includes a slot, the first arm passing through the first hoop slot and the second hoop slot.

34. The joint of claim 32 wherein the first axis is coaxial with the third axis thereby defining a first common axis and the second axis is coaxial with the fourth axis, thereby defining a second common axis.

35. The joint of claim 34 further comprising a first kite linkage constraining the first and third hoops to pivot about the first common axis in mirror image relationship to one another, and a second kite linkage constraining the second and fourth hoops to pivot about the second common axis in mirror image relationship to one another.

36. The joint of claim 35 wherein the first kite linkage includes a first slip ring coupled to the first center link for rotation about the rotation point and the second kite linkage includes a second slip ring coupled to the first center link for rotation about the rotation point.

37. A joint, comprising:
first and second interconnected, circular equator links lying substantially in an equator plane, each equator link being rotatable relative to the other equator link within the equator plane about a center point, the first equator link carrying a pair of pivot blocks aligned on a first axis bisecting the first equator link and passing through the center point, the second equator link carrying a pair of pivot blocks aligned on a second axis bisecting the second equator link and passing through the center point;
a first pair of semicircular links pivotally connected between the pivot blocks of the first equator link disposed on opposite sides of the equator plane;
a second pair of semicircular links pivotally connected between the pivot blocks of the second equator link disposed on opposite sides of the plane;
a first carriage unit interconnecting one of the semicircular links of the first pair of semicircular links to one of the semicircular links of the second pair of semicircular links in a fixed angular relationship;
a second carriage unit interconnecting the other of the semicircular links of the first pair of semicircular links to the other of the semicircular links of the second pair of semicircular links in a fixed angular relationship.

38. The joint of claim 37 further comprising a mechanical constraint apparatus coupled to the first and second pairs of semicircular links, the mechanical constraint apparatus imposing a mirror image relationship about the equator plane between the semicircular links of the first pair of semicircular links and between the semicircular links of the second pair of semicircular links.

39. The joint of claim 37 wherein the fixed angular relationship between the one semicircular links is ninety degrees and the fixed angular relationship between the other semicircular links is ninety degrees.

40. The joint of claim 37 wherein the one semicircular link of the first pair of semicircular links is radially larger than the one semicircular link of the second pair of semicircular links, and the other semicircular link of the first pair of semicircular links is radially smaller than the other semicircular link of the second pair of semicircular links.

41. The joint of claim 37 wherein the first carriage unit interconnects the one semicircular links in overlapping relationship at a first overlap point and the second carriage unit interconnects the other semicircular links in overlapping relationship at a second overlap point.

42. The joint of claim 37 wherein the mechanical constraint apparatus includes a first pair of gear packs disposed within the first equator link pivot blocks in operable association with the first pair of semicircular links, and a second pair of gear packs disposed within the second equator link pivot blocks in operable association with the second pair of semicircular links.

43. The joint of claim 37 wherein the mechanical constraint apparatus includes first and second slip rings disposed in bearing relationship with the first equator link, a first pair of coupler links pivotally connected between the first slip ring and the first pair of semicircular links for moving the first pair of semicircular links according to a mirror image relationship about the equator plane, and a second pair of coupler links pivotally connected between the second slip ring and the second pair of semicircular links for moving the second pair of semicircular links according to a mirror image relationship about the equator plane.

44. The joint of claim 41 wherein the first carriage unit supports a first arm in fixed, offset relationship to the first overlap point, and the second carriage unit supports a second arm in fixed, offset relationship to the second overlap point.

45. The joint of claim 44 wherein the first arm has an axis passing through the center point and the first overlap point, and the second arm has an axis passing through the center point and the second overlap point.

46. The joint of claim 45 wherein each of the semicircular links includes a slot, the first overlap point being within the slots of the semicircular links coupled to the first carriage unit, the second overlap point being within the slots of the semicircular links coupled to the second carriage unit.

47. A linkage for constraining the movement of a pair of adjustable links disposed in adjacent hemispheres of a mechanical joint having an equator, comprising:
   a slip ring adapted for rotation about the equator; and
   a pair of coupler links movably connected at one end to the slip ring, one of the coupler links being movably connected at the other end to one of the adjustable links, the other of the coupler links being movably connected at the other end to the other of the adjustable links.

48. A mechanical joint, comprising:
   a center linkage including a first and second center link, each rotatable about a rotation point;
   a first link having a pair of ends pivotally coupled to the first center link to pivot about a first axis passing through the rotation point;
   a second link having a pair of ends pivotally coupled to the second center link to pivot about a second axis passing through the rotation point;
   a third link having a pair of ends pivotally coupled to the first center link to pivot about a third axis passing through the rotation point;
   a fourth link having a pair of ends pivotally coupled to the second center link to pivot about a fourth axis passing through the rotation point;
   a first carriage unit interconnecting the first and second links at a fixed angle at a first point of overlap;
   a second carriage unit interconnecting the third and fourth links at a fixed angle at a second point of overlap;
   wherein the first and third axes are coaxial, thereby defining a first common axis, and the second and fourth axes are coaxial, thereby defining a second common axis;
   an actuator in operable association with the center linkage and the first, second, third, and fourth links for controllably rotating the first and second center links about the rotation point, and controllably pivoting the first and third links about the first common axis, and the second and fourth links about the second common axis; and
   wherein the actuator includes a first push/pull rod connected to the first center link and a second push/pull rod connected to the second center link.

49. A mechanical joint, comprising:
   a center linkage including a first and second center link, each rotatable about a rotation point;
   a first link having a pair of ends pivotally coupled to the first center link to pivot about a first axis passing through the rotation point;
   a second link having a pair of ends pivotally coupled to the second center link to pivot about a second axis passing through the rotation point;
   a third link having a pair of ends pivotally coupled to the first center link to pivot about a third axis passing through the rotation point;
   a fourth link having a pair of ends pivotally coupled to the second center link to pivot about a fourth axis passing through the rotation point;
   a first carriage unit interconnecting the first and second links at a fixed angle at a first point of overlap;
   a second carriage unit interconnecting the third and fourth links at a fixed angle at a second point of overlap;
   wherein the first and third axes are coaxial, thereby defining a first common axis, and the second and fourth axes are coaxial, thereby defining a second common axis; and
   a first kite linkage for constraining the movement of the first and third links so that the first and third links pivot in mirror image relationship relative to one another about the first common axis, and a second kite linkage for constraining the movement of the second and fourth links so that the second and fourth links pivot in mirror image relationship relative to one another about the second common axis.

50. The joint of claim 49 wherein the first kite linkage includes a first slip ring supported by the center linkage for rotation about the rotation point, and a first pair of coupler links connected between the first slip ring and the first and third links, and the second kite linkage includes a second slip ring supported by the center linkage for rotation about the rotation point, and a second pair of coupler links connected between the second slip ring and the second and fourth links.

51. The joint of claim 50 wherein the first pair of coupler links are pivotally connected at one end to the first slip ring, one coupler link of the first pair of coupler links being pivotally connected at the other end to the first link, the other coupler link of the first pair of coupler links being pivotally connected at the other end to the third link, and the second pair of coupler links are pivotally connected at one end to the second slip ring, one coupler link of the second pair of coupler links being pivotally connected at the other end to the second link, the other coupler link of the second pair of coupler links being pivotally connected at the other end to the fourth link.

52. A mechanical joint, comprising:
   a first center link being rotatable about a rotation point;
   a second center link coupled to the first center link being rotatable about the rotation point and relative to the first center link;
   a first hoop pivotally coupled to the first center link to pivot about a first axis passing through the rotation point;
   a second hoop pivotally coupled to the second center link at a fixed angle relative to the first hoop to pivot about a second axis passing through the rotation point;
   a third hoop pivotally coupled to the first center link to pivot about a third axis passing through the rotation point;
   a fourth hoop pivotally coupled to the second center link at a fixed angle relative to the third hoop to pivot about a fourth axis passing through the rotation point;
   wherein the first axis is coaxial with the third axis thereby defining a first common axis and the second axis is coaxial with the fourth axis, thereby defining a second common axis; and
   a first kite linkage constraining the first and third hoops to pivot about the first common axis in mirror image relationship to one another, and a second kite linkage constraining the second and fourth hoops to pivot about the second common axis in mirror image relationship to one another.

53. The joint of claim 52 wherein the first kite linkage includes a first slip ring coupled to the first center link for rotation about the rotation point and the second kite linkage includes a second slip ring coupled to the first center link for rotation about the rotation point.

54. A joint, comprising:
   first and second interconnected, circular equator links lying substantially in an equator plane, each equator link being rotatable relative to the other equator link within the equator plane about a center point, the first equator link carrying a pair of pivot blocks aligned on a first axis bisecting the first equator link and passing through the center point, the second equator link carrying a pair of pivot blocks aligned on a second axis bisecting the second equator link and passing through the center point;
   a first pair of semicircular links pivotally connected between the pivot blocks of the first equator link disposed on opposite sides of the equator plane;
   a second pair of semicircular links pivotally connected between the pivot blocks of the second equator link disposed on opposite sides of the plane;
   a first carriage unit interconnecting one of the semicircular links of the first pair of semicircular links to one of the semicircular links of the second pair of semicircular links in a fixed angular relationship;
   a second carriage unit interconnecting the other of the semicircular links of the first pair of semicircular links to the other of the semicircular links of the second pair of semicircular links in a fixed angular relationship; and
   wherein the mechanical constraint apparatus includes first and second slip rings disposed in bearing relationship with the first equator link, a first pair of coupler links pivotally connected between the first slip ring and the first pair of semicircular links for moving the first pair of semicircular links according to a mirror image relationship about the equator plane, and a second pair of coupler links pivotally connected between the second slip ring and the second pair of semicircular links for moving the second pair of semicircular links according to a mirror image relationship about the equator plane.

* * * * *